(12) United States Patent
Qing et al.

(10) Patent No.: US 10,846,671 B2
(45) Date of Patent: Nov. 24, 2020

(54) CREDIT CONTROL METHOD, POLICY AND CHARGING ENFORCEMENT FUNCTION ENTITY, AND ONLINE CHARGING SYSTEM

(71) Applicant: Huawei Technologies Co., Ltd., Shenzhen (CN)

(72) Inventors: Hua Qing, Beijing (CN); Chong Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 610 days.

(21) Appl. No.: 14/980,931

(22) Filed: Dec. 28, 2015

(65) Prior Publication Data

US 2016/0117658 A1 Apr. 28, 2016

Related U.S. Application Data

(63) Continuation of application No. PCT/CN2013/078363, filed on Jun. 28, 2013.

(51) Int. Cl.
*G06Q 20/14* (2012.01)
*H04L 12/14* (2006.01)
(Continued)

(52) U.S. Cl.
CPC ....... *G06Q 20/145* (2013.01); *H04L 12/1407* (2013.01); *H04L 61/2007* (2013.01); *H04L 67/14* (2013.01)

(58) Field of Classification Search
CPC ... G06Q 20/145; H04L 67/14; H04L 61/2007; H04L 12/1407
(Continued)

(56) References Cited

U.S. PATENT DOCUMENTS 9,479,917 B1 * 10/2016 Gota .................. H04W 4/26
2007/0124254 A1 * 5/2007 Watson .............. H04M 15/854
705/77
(Continued)

FOREIGN PATENT DOCUMENTS

CN 101127629 A 2/2008
CN 101277204 A 10/2008
(Continued)

OTHER PUBLICATIONS

"Digital Cellular Telecommunications System (Phase 2+); Universal Mobile Telecommunications System (UMTS); Policy and Charging Control Architecture (3GPP TS 23.203 Version 7.4.0 Release 7)," ETSI TS 123 203, V7.4.0, Oct. 2007, 74 pages.
(Continued)

*Primary Examiner* — Mazda Sabouri
(74) *Attorney, Agent, or Firm* — Slater Matsil, LLP

(57) ABSTRACT

Embodiments of the present invention provide a credit control method, a policy and charging enforcement function entity, and an online charging system. The method includes: if an OCS determines that a service borne by a second bearer may share a credit pool with a service borne by a first bearer, sending a second quota allocated to the second bearer and a credit pool identifier corresponding to the first bearer to the PCEF, so that the PCEF stores the second quota and a first quota in a same credit pool, so that the second bearer and the first bearer use the same credit pool, thereby implementing sharing of the credit pool between IP-CAN bearers and even between IP-CAN sessions, and ensuring smoothness of a service.

20 Claims, 9 Drawing Sheets

(51) Int. Cl.
*H04L 29/12* (2006.01)
*H04L 29/08* (2006.01)

(58) Field of Classification Search
USPC .......................................................... 455/408
See application file for complete search history.

(56) References Cited

U.S. PATENT DOCUMENTS

| | | | |
|---|---|---|---|
| 2008/0046963 A1 | 2/2008 | Grayson et al. | |
| 2009/0154456 A1 | 6/2009 | Dodson et al. | |
| 2010/0180319 A1* | 7/2010 | Hu | H04L 12/14 726/1 |
| 2012/0144049 A1* | 6/2012 | Lopez Nieto | H04L 12/14 709/228 |
| 2012/0284189 A1 | 11/2012 | Gardella et al. | |
| 2012/0320801 A1* | 12/2012 | Yang | H04L 12/14 370/259 |
| 2013/0109346 A1* | 5/2013 | Deng | H04L 12/1417 455/406 |
| 2013/0132854 A1* | 5/2013 | Raleigh | G06F 3/0482 715/738 |
| 2013/0303114 A1* | 11/2013 | Ahmad | H04W 16/14 455/406 |
| 2013/0315106 A1* | 11/2013 | Anulf | H04L 12/1467 370/259 |
| 2014/0344472 A1* | 11/2014 | Lovsen | H04L 47/72 709/232 |
| 2014/0348030 A1* | 11/2014 | Tornkvist | H04L 12/1435 370/259 |
| 2018/0159725 A1* | 6/2018 | Goermer | H04M 15/65 |

FOREIGN PATENT DOCUMENTS

| | | |
|---|---|---|
| CN | 102714599 A | 10/2012 |
| EP | 1475947 A1 | 11/2004 |
| EP | 2466787 A1 | 6/2012 |
| EP | 2493221 A1 | 8/2012 |
| WO | 2013170045 A2 | 11/2013 |

OTHER PUBLICATIONS

"3rd Generation Partnership Project; Technical Specification Group Services and System Aspects; Policy and Charging Control Architecture (Release 12)," 3GPP TS 23.203, V12.1.0, Jun. 2013, 189 pages.

"3rd Generation Partnership Project; Technical Specification Group Services and System Aspects; Telecommunication Management; Charging Management; Packet Switched (PS) Domain Charging (Release 12)," 3GPP TS 32.251, V12.2.0, Jun. 2013, 92 pages.

"3rd Generation Partnership Project; Technical Specification Group Services and System Aspects; Telecommunication Management; Charging Management; Diameter Charging Applications (Release 12)," 3GPP TS 32.299, V12.1.0, Jun. 2013, 154 pages.

Hakala, H., et al. "Diameter Credit-Control Application," Network Working Group, Category: Standards Track, Aug. 2005, 114 pages.

* cited by examiner

CREDIT CONTROL METHOD, POLICY AND CHARGING ENFORCEMENT FUNCTION ENTITY, AND ONLINE CHARGING SYSTEM

This application is a continuation of International Patent Application No. PCT/CN2013/078363, filed on Jun. 28, 2013, which is hereby incorporated by reference in its entirety.

TECHNICAL FIELD

Embodiments of the present invention relate to mobile communications technologies, and in particular, to a credit control method, a policy and charging enforcement function entity, and an online charging system.

BACKGROUND

In an online charging application, an online charging system (OCS) freezes a part of money in a user account, and converts this part of money into a quota corresponding to a service, and then delivers the quota to a policy and charging enforcement function (PCEF), and the PCEF monitors quota consumption of the service. In the monitoring process, the frozen money or quota cannot be consumed by other services, that is, the quota of each service cannot be shared. Therefore, when online charging credit control is performed on multiple services jointly, the quota reserved by the OCS for some services may be not consumed completely, and the quota that is not consumed completely forms a credit fragment. Because the credit fragment cannot be consumed by a service newly initiated by a user, no quota is available for the newly initiated service, resulting in a service access failure.

Currently, to avoid occurrence of a credit fragment, a credit pool (Credit Pool) is introduced. Specifically, based on a Packet Data Protocol (PDP) context (PDP Context or an Internet Protocol connectivity access network bearer (IP-CAN bearer) level, the OCS associates quotas corresponding to services in each PDP context or IP-CAN bearer with a same credit pool. The credit pool of each PDP context or IP-CAN bearer is independent of each other. A service obtains a quota from a credit pool corresponding to the PDP context or IP-CAN bearer to which the service belongs. The credit pool is consumed as a whole by multiple services simultaneously. Therefore, a credit fragment is avoided, and allocation of quotas in the credit control process is more reasonable.

However, speeds of consuming quotas by services in different IP-CAN bearers are different. When an IP-CAN bearer that fast consumes a quota requests a quota again, because other IP-CAN bearers occupy a part of quotas, and the credit pool of each PDP context or IP-CAN bearer is independent of each other, no quota can be allocated to the IP-CAN bearer that fast consumes the quota, and the service is terminated forcibly.

SUMMARY

Embodiments of the present invention provide a credit control method, a policy and charging enforcement function entity, and an online charging system, thereby implementing sharing of a credit pool between IP-CAN bearers and even between IP-CAN sessions, and ensuring smoothness of a service.

According to a first aspect, an embodiment of the present invention provides a credit control method, including: receiving a second request sent by a policy and charging enforcement function entity PCEF, where the second request instructs to perform credit control on a second bearer. The method further includes determining, according to the second request, whether a service borne by the second bearer may share a credit pool with a service borne by a first bearer, where the second bearer is established after the first bearer is established. When the service borne by the second bearer shares the credit pool with the service borne by the first bearer, sending a second answer to the PCEF, where the second answer carries a credit pool identifier corresponding to the first bearer, so that the service borne by the first bearer shares the credit pool with the service borne by the second bearer.

In a first possible implementation manner of the first aspect, before the receiving a second request sent by a policy and charging enforcement function entity PCEF, the method includes receiving a first request sent by the PCEF, where the first request instructs to perform credit control on the first bearer; and sending a first answer to the PCEF, where the first answer carries the credit pool identifier corresponding to the first bearer.

In a second possible implementation manner of the first aspect, the sending the second answer to the PCEF, where the second answer carries a credit pool identifier corresponding to the first bearer, so that the service borne by the first bearer shares the credit pool with the service borne by the second bearer, includes allocating a second quota to the second bearer; and sending the second answer to the PCEF, where the second answer carries the second quota and the credit pool identifier corresponding to the first bearer, so that the PCEF stores the second quota in a credit pool corresponding to the credit pool identifier corresponding to the first bearer, so that the service borne by the first bearer shares the credit pool with the service borne by the second bearer.

With reference to the first possible implementation manner of the first aspect, in a third possible implementation manner of the first aspect, the sending a first answer to the PCEF, where the first answer carries the credit pool identifier corresponding to the first bearer, includes: allocating the first quota to the first bearer; and sending a first answer to the PCEF, where the first answer carries the first quota and the credit pool identifier corresponding to the first bearer.

With reference to the third possible implementation manner of the first aspect, in a fourth possible implementation manner of the first aspect, the receiving a second request sent by a policy and charging enforcement function entity PCEF specifically includes: receiving the second request sent by the policy and charging enforcement function entity PCEF by using a second Gy session. The sending a second answer to the PCEF specifically includes: sending the second answer to the PCEF by using the second Gy session; the receiving a first request sent by the PCEF specifically includes: receiving the first request sent by the policy and charging enforcement function entity PCEF by using a first Gy session; and the sending a first answer to the PCEF specifically includes: sending the first answer to the PCEF by using the first Gy session.

With reference to the fourth possible implementation manner of the first aspect, in a fifth possible implementation manner of the first aspect, the first Gy session and the second Gy session are different Gy sessions; or the first Gy session and the second Gy session are a same shared Gy session.

With reference to the fifth possible implementation manner of the first aspect, in a sixth possible implementation manner of the first aspect, if the first Gy session and the second Gy session are different sessions, both the first request and the second request are initial credit control requests, CCR-initial, and both the first answer and the second answer are initial credit control answers CCA-initial.

With reference to the fifth possible implementation manner of the first aspect, in a seventh possible implementation manner of the first aspect, if the first Gy session and the second Gy session are a same shared Gy session, the first request is an initial credit control request CCR-initial, and the second request is an update credit control request, CCR-Update; and the first answer is an initial credit control answer CCA-initial, and the second request is an update credit control answer CCA-Update.

With reference to the fifth possible implementation manner of the first aspect, in an eighth possible implementation manner of the first aspect, if the first Gy session and the second Gy session are different Gy sessions, after the sending a first answer to the PCEF, the method includes: receiving a first update credit control request sent by the PCEF by using the first Gy session, where the first update credit control request carries a quota consumed by the first bearer; and receiving a second update credit control request sent by the PCEF by using the second Gy session, where the second update credit control request carries a quota consumed by the second bearer; and sending a first update credit control answer to the PCEF by using the first Gy session, where the first update credit control answer carries a quota newly allocated to the first bearer; and sending a second update credit control answer to the PCEF by using the second Gy session, where the second update credit control answer carries a quota newly allocated to the second bearer.

With reference to the fifth possible implementation manner of the first aspect, in a ninth possible implementation manner of the first aspect, if the first Gy session and the second Gy session are a same shared Gy session, after the sending a second answer to the PCEF, the method includes: receiving a third update credit control request sent by the PCEF by using the shared Gy session, where the third update credit control request carries quotas consumed by the first bearer and the second bearer; and sending a third update credit control answer to the PCEF by using the shared Gy session, where the third update credit control answer carries quotas newly allocated to the first bearer and the second bearer.

With reference to the first aspect or any one of the first to the ninth possible implementation manners of the first aspect, in a tenth possible implementation manner of the first aspect, the first bearer and the second bearer belong to a same Internet Protocol connectivity access network session IP-CAN session.

With reference to the first aspect or any one of the first to the ninth possible implementation manners of the first aspect, in an eleventh possible implementation manner of the first aspect, the first bearer belongs to a first IP-CAN session, and the second bearer belongs to a second IP-CAN session, where the first IP-CAN session and the second IP-CAN session are different.

With reference to any one of the second to the eleventh possible implementation manners of the first aspect, in a twelfth possible implementation manner of the first aspect, after the allocating a second quota to the second bearer, the method includes converting the second quota into a credit unit.

With reference to the first aspect or any one of the first to the twelfth possible implementation manners of the first aspect, in a thirteenth possible implementation manner of the first aspect, the method further includes: receiving a capability negotiation request sent by the PCEF, where the capability negotiation request carries a capability negotiation information element (IE) indicating a credit pool application manner; and sending a capability negotiation field answer to the PCEF.

According to a second aspect, an embodiment of the present invention provides a credit control method, including: sending a second request to an online charging system OCS, where the second request instructs to perform credit control on a second bearer; receiving a second answer sent by the OCS, where the second answer carries a credit pool identifier corresponding to a first bearer, and the second bearer is established after the first bearer is established; and causing, according to the credit pool identifier, a service borne by the first bearer to share the credit pool with a service borne by the second bearer.

In a first possible implementation manner of the second aspect, before the sending a second request to an online charging system OCS, the method includes: sending a first request to the OCS, where the first request instructs to perform credit control on the first bearer; and receiving a first answer sent by the OCS, where the first answer carries the credit pool identifier corresponding to the first bearer.

In a second possible implementation manner of the second aspect, the receiving a second answer sent by the OCS, where the second answer carries a credit pool identifier corresponding to a first bearer, includes: receiving a second answer carrying a second quota and the credit pool identifier corresponding to the first bearer.

With reference to the second possible implementation manner of the second aspect, in a third possible implementation manner of the second aspect, the receiving a first answer sent by the OCS, where the first answer carries the credit pool identifier corresponding to the first bearer, includes: receiving a first answer carrying a first quota and the credit pool identifier corresponding to the first bearer.

With reference to the third possible implementation manner of the second aspect, in a fourth possible implementation manner of the second aspect, the sending a second request to the OCS specifically includes: sending the second request to the OCS by using a second Gy session; the receiving a second answer sent by the OCS includes: receiving the second answer sent by the OCS by using the second Gy session; the sending a first request to the OCS specifically includes: sending the first request to the OCS by using a first Gy session; and the receiving a first answer sent by the OCS includes: receiving the first answer sent by the OCS by using the first Gy session.

With reference to the fourth possible implementation manner of the second aspect, in a fifth possible implementation manner of the second aspect, the first Gy session and the second Gy session are different Gy sessions; or the first Gy session and the second Gy session are a same shared Gy session.

With reference to the fifth possible implementation manner of the second aspect, in a sixth possible implementation manner of the second aspect, if the first Gy session and the second Gy session are different sessions, both the first request and the second request are initial credit control requests CCR-initial, and both the first answer and the second answer are initial credit control answers CCA-initial.

With reference to the fifth possible implementation manner of the second aspect, in a seventh possible implementation manner of the second aspect, if the first Gy session and the second Gy session are a same shared Gy session, the first request is an initial credit control request CCR-initial, and the second request is an update credit control request CCR-Update; and the first answer is an initial credit control answer CCA-initial, and the second request is an update credit control answer CCA-Update.

With reference to the fifth possible implementation manner of the second aspect, in an eighth possible implementation manner of the second aspect, if the first Gy session and the second Gy session are different Gy sessions, after the storing the second quota and the first quota in a same credit pool so that the service borne by the first bearer shares the credit pool with the service borne by the second bearer, the method includes: sending a first update credit control request to the OCS by using the first Gy session, where the first update credit control request carries a quota consumed by the first bearer; and sending a second update credit control request to the OCS by using the second Gy session, where the second update credit control request carries a quota consumed by the second bearer; and receiving a first update credit control answer sent by the OCS by using the first Gy session, where the first update credit control answer carries a quota newly allocated to the first bearer; and receiving a second update credit control answer sent by the OCS by using the second Gy session, where the second update credit control answer carries a quota newly allocated to the second bearer.

With reference to the fifth possible implementation manner of the second aspect, in a ninth possible implementation manner of the second aspect, if the first Gy session and the second Gy session are a same shared Gy session, after the storing the second quota and the first quota in a same credit pool so that the service borne by the first bearer shares the credit pool with the service borne by the second bearer, the method includes: sending a third update credit control request to the OCS by using the shared Gy session, where the third update credit control request carries quotas consumed by the first bearer and the second bearer; and receiving a third update credit control answer sent by the OCS by using the shared Gy session, where the third update credit control answer carries quotas newly allocated to the first bearer and the second bearer.

With reference to the second aspect or any one of the first to the ninth possible implementation manners of the second aspect, in a tenth possible implementation manner of the second aspect, the first bearer and the second bearer belong to a same Internet Protocol connectivity access network session IP-CAN session.

With reference to the second aspect or any one of the first to the ninth possible implementation manners of the second aspect, in an eleventh possible implementation manner of the second aspect, the first bearer belongs to a first IP-CAN session, and the second bearer belongs to a second IP-CAN session, where the first IP-CAN session and the second IP-CAN session are different.

With reference to the second aspect or any one of the first to the eleventh possible implementation manners of the second aspect, in a twelfth possible implementation manner of the second aspect, after the receiving a second answer sent by the OCS, where the second answer carries the second quota and the credit pool identifier corresponding to the first quota of the first bearer, the method includes: converting the second quota into a credit unit.

With reference to the second aspect or any one of the first to the twelfth possible implementation manners of the second aspect, in a thirteenth possible implementation manner of the second aspect, the method further includes: sending a capability negotiation request to the OCS, where the capability negotiation request carries a capability negotiation information element (IE) indicating a credit pool application manner; and receiving a capability negotiation field answer sent by the OCS.

According to a third aspect, an embodiment of the present invention provides an online charging system, including: a receiving module, configured to receive a second request sent by a policy and charging enforcement function entity PCEF, where the second request instructs to perform credit control on a second bearer; a determining module, configured to determine, according to the second request, whether a service borne by the second bearer may share a credit pool with a service borne by a first bearer, where the second bearer is established after the first bearer is established; and a sending module, configured to: if the determining module determines that the service borne by the second bearer may share the credit pool with the service borne by the first bearer, send a second answer to the PCEF, where the second answer carries a credit pool identifier corresponding to the first bearer, so that the service borne by the first bearer shares the credit pool with the service borne by the second bearer.

In a first possible implementation manner of the third aspect, the receiving module is further configured to: receive a first request sent by the PCEF, where the first request instructs to perform credit control on the first bearer; and the sending module is further configured to send a first answer to the PCEF, where the first answer carries the credit pool identifier corresponding to the first bearer.

In a second possible implementation manner of the third aspect, the online charging system further includes: an allocating module, configured to allocate a second quota to the second bearer; where the sending module is configured to send the second answer to the PCEF, where the second answer carries the second quota and the credit pool identifier corresponding to the first bearer, so that the PCEF stores the second quota in a credit pool corresponding to the credit pool identifier corresponding to the first bearer, so that the service borne by the first bearer shares the credit pool with the service borne by the second bearer.

With reference to the first possible implementation manner of the third aspect, in a third possible implementation manner of the third aspect, the online charging system further includes: an allocating module, configured to allocate the first quota to the first bearer; where the sending module is further configured to send a first answer to the PCEF, where the first answer carries the first quota and the credit pool identifier corresponding to the first bearer.

With reference to the third possible implementation manner of the third aspect, in a fourth possible implementation manner of the third aspect, the receiving module is specifically configured to receive the second request sent by the policy and charging enforcement function entity PCEF by using a second Gy session; the sending module is specifically configured to send the second answer to the PCEF by using the second Gy session; the receiving module is further configured to receive the second request sent by the policy and charging enforcement function entity PCEF by using a first Gy session; and the sending module is specifically configured to send the first answer to the PCEF by using the first Gy session.

With reference to the fourth possible implementation manner of the third aspect, in a fifth possible implementation manner of the third aspect, the first Gy session and the second Gy session are different Gy sessions; or the first Gy session and the second Gy session are a same shared Gy session.

With reference to the fifth possible implementation manner of the third aspect, in a sixth possible implementation manner of the third aspect, if the first Gy session and the second Gy session are different sessions, both the first request and the second request are initial credit control requests CCR-initial, and both the first answer and the second answer are initial credit control answers CCA-initial.

With reference to the fifth possible implementation manner of the third aspect, in a seventh possible implementation manner of the third aspect, if the first Gy session and the second Gy session are a same shared Gy session, the first request is an initial credit control request CCR-initial, and the second request is an update credit control request CCR-Update; and the first answer is an initial credit control answer CCA-initial, and the second request is an update credit control answer CCA-Update.

With reference to the fifth possible implementation manner of the third aspect, in an eighth possible implementation manner of the third aspect, if the first Gy session and the second Gy session are different Gy sessions, the receiving module is further configured to: receive a first update credit control request sent by the PCEF by using the first Gy session, where the first update credit control request carries a quota consumed by the first bearer; and receive a second update credit control request sent by the PCEF by using the second Gy session, where the second update credit control request carries a quota consumed by the second bearer. The sending module is further configured to send a first update credit control answer to the PCEF by using the first Gy session, where the first update credit control answer carries a quota newly allocated to the first bearer; and send a second update credit control answer to the PCEF by using the second Gy session, where the second update credit control answer carries a quota newly allocated to the second bearer.

With reference to the fifth possible implementation manner of the third aspect, in a ninth possible implementation manner of the third aspect, if the first Gy session and the second Gy session are a same shared Gy session, the receiving module is further configured to: receive a third update credit control request sent by the PCEF by using the shared Gy session, where the third update credit control request carries quotas consumed by the first bearer and the second bearer. The sending module is further configured to send a third update credit control answer to the PCEF by using the shared Gy session, where the third update credit control answer carries quotas newly allocated to the first bearer and the second bearer.

With reference to the third aspect or any one of the first to the ninth possible implementation manners of the third aspect, in a tenth possible implementation manner of the third aspect, the first bearer and the second bearer belong to a same Internet Protocol connectivity access network session IP-CAN session.

With reference to the third aspect or any one of the first to the ninth possible implementation manners of the third aspect, in an eleventh possible implementation manner of the third aspect, the first bearer belongs to a first IP-CAN session, and the second bearer belongs to a second IP-CAN session, where the first IP-CAN session and the second IP-CAN session are different.

With reference to any one of the second to the eleventh possible implementation manners of the third aspect, in a twelfth possible implementation manner of the third aspect, the online charging system further includes: a converting module, configured to convert the second quota into a credit unit.

With reference to the third aspect or any one of the first to the twelfth possible implementation manners of the third aspect, in a thirteenth possible implementation manner of the third aspect, the receiving module is further configured to receive a capability negotiation request sent by the PCEF, where the capability negotiation request carries a capability negotiation information element (IE) indicating a credit pool application manner. The sending module is further configured to send a capability negotiation field answer to the PCEF.

According to a fourth aspect, an embodiment of the present invention provides a policy and charging enforcement function entity PCEF, including: a sending module, configured to send a second request to an online charging system OCS, where the second request instructs to perform credit control on a second bearer;
a receiving module, configured to receive a second answer sent by the OCS, where the second answer carries the second quota and a credit pool identifier corresponding to a first quota of the first bearer, where the second quota is a quota allocated by the OCS to the second bearer, and the second bearer is established after the first bearer is established; and a processing module, configured to store the second quota and the first quota in a same credit pool, so that a service borne by the first bearer shares the credit pool with a service borne by the second bearer.

In a first possible implementation manner of the fourth aspect, the sending module is further configured to send a first request to the OCS, where the first request instructs to perform credit control on the first bearer; and the receiving module is further configured to receive a first answer sent by the OCS, where the first answer carries the first quota and the credit pool identifier corresponding to the first quota of the first bearer.

In a second possible implementation manner of the fourth aspect, the receiving module is specifically configured to receive the second answer carrying the second quota and the credit pool identifier corresponding to the first bearer.

With reference to the first possible implementation manner of the fourth aspect, in a third possible implementation manner of the fourth aspect, the receiving module is specifically configured to receive the first answer carrying the first quota and the credit pool identifier corresponding to the first bearer.

With reference to the third possible implementation manner of the fourth aspect, in a fourth possible implementation manner of the fourth aspect, the sending module is specifically configured to send the second request to the OCS by using a second Gy session; the receiving module is specifically configured to receive the second answer sent by the OCS by using the second Gy session; the sending module is further configured to send the first request to the OCS by using a first Gy session; and the receiving module is further configured to receive the first answer sent by the OCS by using the first Gy session.

With reference to the fourth possible implementation manner of the fourth aspect, in a fifth possible implementation manner of the fourth aspect, the first Gy session and the second Gy session are different Gy sessions; or the first Gy session and the second Gy session are a same shared Gy session.

With reference to the fifth possible implementation manner of the fourth aspect, in a sixth possible implementation manner of the fourth aspect, if the first Gy session and the second Gy session are different sessions, both the first request and the second request are initial credit control requests CCR-initial, and both the first answer and the second answer are initial credit control answers CCA-initial.

With reference to the fifth possible implementation manner of the fourth aspect, in a seventh possible implementation manner of the fourth aspect, if the first Gy session and the second Gy session are a same shared Gy session, the first request is an initial credit control request CCR-initial, and the second request is an update credit control request CCR-Update; and the first answer is an initial credit control answer CCA-initial, and the second request is an update credit control answer CCA-Update.

With reference to the fifth possible implementation manner of the fourth aspect, in an eighth possible implementation manner of the fourth aspect, if the first Gy session and the second Gy session are different Gy sessions, the sending module is further configured to: send a first update credit control request to the OCS by using the first Gy session, where the first update credit control request carries a quota consumed by the first bearer; and send a second update credit control request to the OCS by using the second Gy session, where the second update credit control request carries a quota consumed by the second bearer; and the receiving module is further configured to receive a first update credit control answer sent by the OCS by using the first Gy session where the first update credit control answer carries a quota newly allocated to the first bearer; and receive a second update credit control answer sent by the OCS by using the second Gy session, where the second update credit control answer carries a quota newly allocated to the second bearer.

With reference to the fifth possible implementation manner of the fourth aspect, in a ninth possible implementation manner of the fourth aspect, if the first Gy session and the second Gy session are a same shared Gy session, the sending module is further configured to: send a third update credit control request to the OCS by using the shared Gy session, where the third update credit control request carries quotas consumed by the first bearer and the second bearer; and the receiving module is further configured to receive a third update credit control answer sent by the OCS by using the shared Gy session, where the third update credit control answer carries quotas newly allocated to the first bearer and the second bearer.

With reference to the fourth aspect or any one of the first to the ninth possible implementation manners of the fourth aspect, in a tenth possible implementation manner of the fourth aspect, the first bearer and the second bearer belong to a same Internet Protocol connectivity access network session IP-CAN session.

With reference to the fourth aspect or any one of the first to the ninth possible implementation manners of the fourth aspect, in an eleventh possible implementation manner of the fourth aspect, the first bearer belongs to a first IP-CAN session, and the second bearer belongs to a second IP-CAN session, where the first IP-CAN session and the second IP-CAN session are different.

With reference to the fourth aspect or any one of the first to the eleventh possible implementation manners of the fourth aspect, in a twelfth possible implementation manner of the fourth aspect, the PCEF further includes: a converting module, configured to convert the second quota into a credit unit.

With reference to the fourth aspect or any one of the first to the twelfth possible implementation manners of the fourth aspect, in a thirteenth possible implementation manner of the fourth aspect, the sending module is further configured to send a capability negotiation request to the OCS, where the capability negotiation request carries a capability negotiation information element (IE) indicating a credit pool application manner; and the receiving module is further configured to receive a capability negotiation field answer sent by the OCS.

According to a fifth aspect, an embodiment of the present invention provides an online charging system, including a processor and a memory, where: the memory stores an executable instruction; when the online charging system runs, the processor communicates with the memory; and the processor executes the executable instruction to cause the online charging system to execute the method according to the first aspect or any one of the first to the thirteenth possible implementation manners of the first aspect.

According to a sixth aspect, an embodiment of the present invention provides a policy and charging enforcement function entity PCEF, including a processor and a memory, where: the memory stores an executable instruction; when the PCEF runs, the processor communicates with the memory; and the processor executes the executable instruction to cause the PCEF to execute the method according to the second aspect or any one of the first to thirteenth possible implementation manners of the second aspect.

According to the credit control method, policy and charging enforcement function entity, and online charging system provided by the embodiments of the present invention, if the OCS determines that a service borne by a second bearer may share a credit pool with a service borne by a first bearer, the OCS sends a second quota allocated to the second bearer and a credit pool identifier corresponding to the first bearer to the PCEF, so that the PCEF stores the second quota and a first quota in a same credit pool, so that the second bearer and the first bearer use the same credit pool. If the first bearer and the second bearer are in a same IP-CAN session, it is implemented that multiple IP-CAN bearers share the credit pool under the same IP-CAN Session. For example, the credit pool is shared between all IP-CAN bearers in the same IP-CAN Session; or the credit pool is shared between a default bearer and a part of dedicated bearers in the same IP-CAN Session; or the credit pool is shared between a part of dedicated bearers in the same IP-CAN Session. If the first bearer and the second bearer are in different IP-CAN sessions, it is implemented that the credit pool is shared between the IP-CAN sessions. For example, all IP-CAN sessions of a same user share the credit pool; or a part of IP-CAN sessions of a same user share the credit pool.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
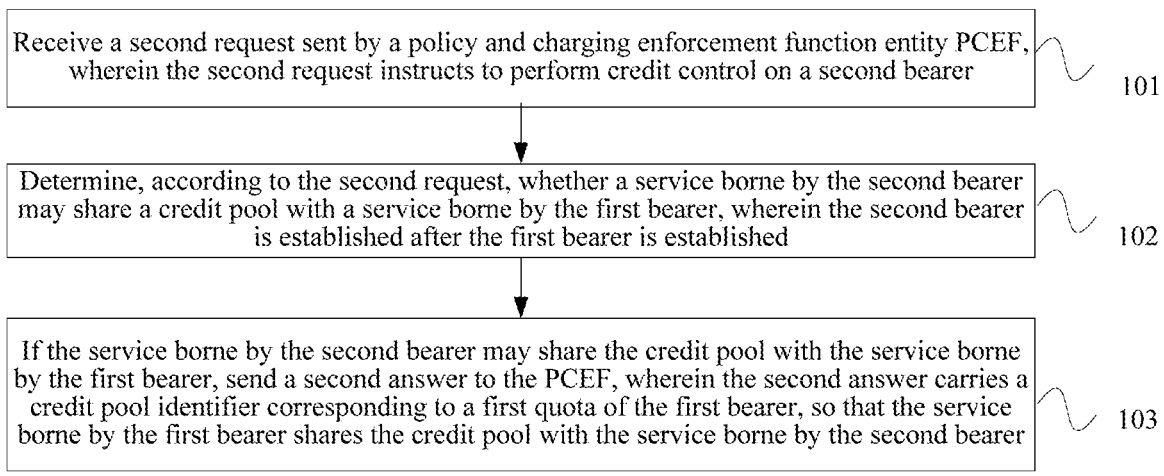
FIG. 1 is a flowchart of Embodiment 1 of a credit control method according to the present invention.

FIG. 1 is a flowchart of Embodiment 1 of a credit control method according to the present invention. The execution entity of this embodiment is an online charging system (OCS), and supports sharing of a credit pool between IP-CAN bearers or between IP connectivity access network sessions (IP-CAN Sessions). Specifically, this embodiment includes the following steps:

101. Receive a second request sent by a policy and charging enforcement function entity PCEF, where the second request instructs to perform credit control on a second bearer.

When a user equipment in an online state performs a new service, a new bearer is established for the user equipment. For clear description, a bearer bearing the new service and established for the user equipment is hereinafter referred to as the second bearer, and a bearer that already exists before the second bearer is established is referred to as a first bearer. For example, in a same IP-CAN session, the first bearer is a default bearer or a dedicated bearer that already exists when a new service is initiated, and the second bearer is a dedicated bearer that is established after the first bearer is established; or in different IP-CAN sessions, the first bearer is a default bearer in an IP-CAN Session or a dedicated bearer that is already established when a new service is initiated, and the second bearer is a default bearer or dedicated bearer that is established for bearing the new service and in another IP-Session, and the second bearer is established after the first bearer is established.

In this step, after the second bearer is established, if the PCEF finds that it is necessary to perform online charging on the second bearer, the PCEF sends a second request to a corresponding OCS, where the second request instructs the OCS to perform credit control on the second bearer, and the corresponding OCS receives the second request.

102. Determine, according to the second request, whether a service borne by the second bearer may share a credit pool with a service borne by the first bearer, where the second bearer is established after the first bearer is established.

After receiving the second request, the OCS determines whether the service borne by the second bearer may share the credit pool with the service borne by the first bearer. For example, according to a policy preset by an operator, if the service borne by the second bearer and the service borne by the first bearer have a same tariff standard, the credit pool is shared; or if the service borne by the second bearer is relatively urgent, the credit pool is shared; or according to a preset rule or the like, it is determined whether the service borne by the second bearer may share the credit pool with the service borne by the first bearer, to which it is not limited by the present invention.

103. If the service borne by the second bearer may share the credit pool with the service borne by the first bearer, send a second answer to the PCEF, where the second answer carries a credit pool identifier corresponding to a first quota of the first bearer, so that the service borne by the first bearer shares the credit pool with the service borne by the second bearer.

In this step, if the OCS determines that the service borne by the second bearer may share the credit pool with the service borne by the first bearer, the credit pool identifier corresponding to the first bearer is carried in the second answer, and sent to the PCEF, so that after the PCEF receives the second answer, the service borne by the first bearer shares the credit pool with the service borne by the second bearer; otherwise, if the OCS determines that the service borne by the second bearer cannot share the credit pool with the service borne by the first bearer, the OCS sends a credit pool identifier corresponding to the service borne by the second bearer to the PCEF; or the OCS may not deliver a credit pool identifier but directly send a specific quota, for example, duration, traffic, and the number of times.

Optionally, the sending a second answer to the PCEF, where the second answer carries a credit pool identifier corresponding to the first bearer, so that the service borne by the first bearer shares the credit pool with the service borne by the second bearer, includes: allocating, by the OCS, a second quota to the second bearer; and sending a second answer to the PCEF, where the second answer carries the second quota and the credit pool identifier corresponding to the first bearer, so that the PCEF stores the second quota in a credit pool corresponding to the credit pool identifier corresponding to the first bearer, so that the service borne by the first bearer shares the credit pool with the service borne by the second bearer.

Specifically, the OCS does not distinguish whether the service borne by the second bearer and the service borne by the first bearer belong to a same rating group, but delivers the second quota and credit pool identifier directly based on a rating group, and allocates the second quota according to a credit pool. The credit pool identifier is the credit pool identifier corresponding to the first quota of the first bearer, that is, the first bearer and the second bearer share the credit pool. If the OCS determines that the service borne by the second bearer may share the credit pool with the service borne by the first bearer, the OCS sends a second answer, which carries the second quota and the credit pool identifier corresponding to the first bearer, to the PCEF, so that the PCEF stores the second quota and the first quota in the same credit pool, where the first quota is the quota corresponding to the service borne by the first bearer. For example, after the PCEF checks a multiple services credit control <attribute, value> pair (Multiple Services Credit Control Attribute-Value Pair, MSCC AVP), if the PCEF finds that the service borne by the second bearer belongs to an application of a credit pool, and that the credit pool identifier is the same as the credit pool identifier corresponding to the first bearer, that is, the second bearer shares the credit pool with the first bearer, the PCEF allocates a pool resource to the second bearer locally, and stores the second quota and the first quota in the same credit pool.

Optionally, the OCS may also convert the second quota into a credit unit and then send the credit unit to the PCEF, so that the PCEF stores the credit unit corresponding to the second quota and a credit unit corresponding to the first quota in the same credit pool. For example, the second quota is specifically duration, traffic, and the number of times. The OCS may convert the second quota, and convert the duration, traffic, and the number of times into a unified credit unit according to a conversion factor between the quota and the credit unit.

In the credit control method provided by the embodiment of the present invention, if an OCS determines that a service borne by a second bearer may share a credit pool with a service borne by a first bearer, the OCS sends a second quota allocated to the second bearer and a credit pool identifier corresponding to the first bearer to a PCEF, so that the PCEF stores the second quota and a first quota in a same credit pool, so that the second bearer and the first bearer use the same credit pool. If the first bearer and the second bearer are in a same IP-CAN session, sharing of the credit pool between multiple IP-CAN bearers in the same IP-CAN Session is implemented. For example, the credit pool is shared between all IP-CAN bearers in the same IP-CAN Session; or the credit pool is shared between a default bearer and a part of dedicated bearers in the same IP-CAN Session; or the credit pool is shared between a part of dedicated bearers in the same IP-CAN Session. If the first bearer and the second bearer are in different IP-CAN sessions, sharing of the credit pool between the IP-CAN sessions is implemented. For example, all IP-CAN sessions of a same user share the credit pool; or a part of IP-CAN sessions of a same user share the credit pool.

Further, in the foregoing Embodiment 1, before the receiving a second request sent by a policy and charging enforcement function entity PCEF, the method includes: receiving a first request sent by the PCEF, where the first request instructs to perform credit control on the first bearer; and sending a first answer to the PCEF, where the first answer carries the credit pool identifier corresponding to the first bearer.

Specifically, after the OCS receives the first request sent by the PCEF, the OCS allocates the first quota to the first bearer, and sends a first answer to the PCEF, where the first answer carries the first quota and the credit pool identifier corresponding to the first bearer.

Further, the receiving a second request sent by a policy and charging enforcement function entity PCEF specifically includes: receiving the second request sent by the policy and charging enforcement function entity PCEF by using a second Gy session;

the sending a second answer to the PCEF specifically includes: sending the second answer to the PCEF by using the second Gy session;

the receiving a first request sent by the policy and charging enforcement function entity PCEF specifically includes: receiving the second request sent by the policy and charging enforcement function entity PCEF by using a first Gy session; and the sending a first answer to the PCEF, specifically includes: sending the first answer to the PCEF by using the first Gy session.

Figure 2:
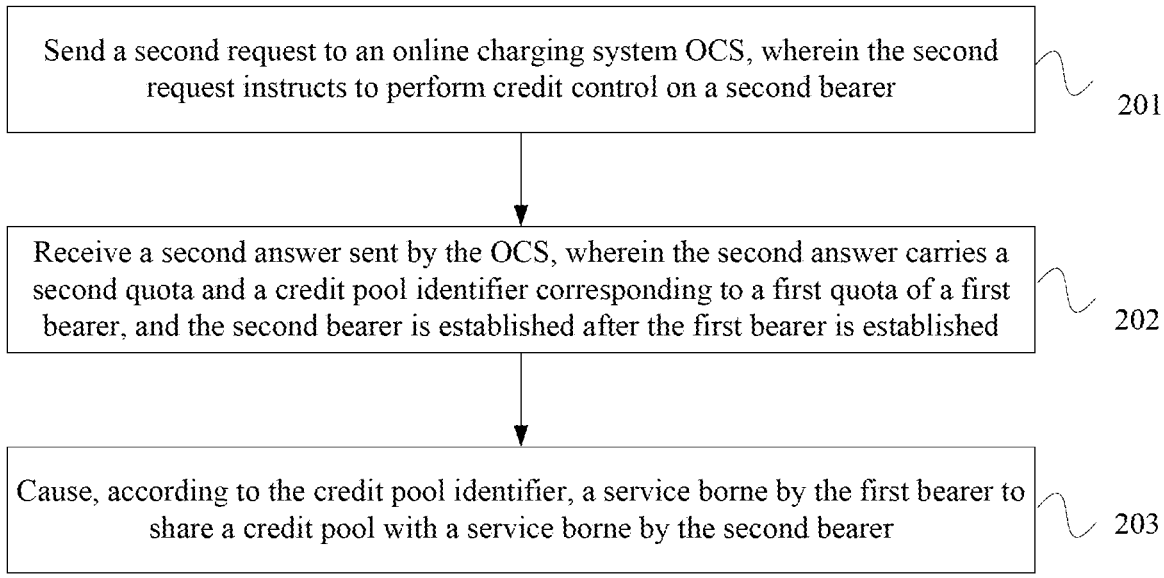
FIG. 2 is a flowchart of Embodiment 2 of a credit control method according to the present invention.

FIG. 2 is a flowchart of Embodiment 2 of a credit control method according to the present invention. The execution entity of this embodiment is a policy and charging enforcement function (Policy and Charging Enforcement Function, PCEF) entity, and supports sharing of a credit pool (Credit Pool) between IP_CAN bearers or between IP-CAN Sessions. Specifically, this embodiment includes the following steps:

201. Send a second request to an online charging system OCS, where the second request instructs to perform credit control on a second bearer.

202. Receive a second answer sent by the OCS, where the second answer carries a second quota and a credit pool identifier corresponding to a first quota of a first bearer, and the second bearer is established after the first bearer is established.

203. Cause, according to the credit pool identifier, a service borne by the first bearer to share a credit pool with a service borne by the second bearer.

In this embodiment, for description about the first bearer, second bearer, first quota, and second quota, reference may be made to the embodiment shown in FIG. 1, and details are not repeatedly described herein.

Further, in the foregoing Embodiment 2, before the sending a second request to an online charging system OCS, the PCEF sends a first request to the OCS, where the first request instructs to perform credit control on the first bearer; and receives a first answer sent by the OCS, where the first answer carries the credit pool identifier corresponding to the first bearer.

Further, in the foregoing Embodiment 2, the receiving a second answer sent by the OCS, where the second answer carries a credit pool identifier corresponding to a first bearer, includes: receiving the second answer carrying the second quota and the credit pool identifier corresponding to the first bearer.

Further, in the foregoing Embodiment 2, the receiving a first answer sent by the OCS, where the first answer carries the credit pool identifier corresponding to the first bearer, includes:

receiving a first answer carrying the first quota and the credit pool identifier corresponding to the first bearer.

Further, the sending a second request to the OCS specifically includes: sending the second request to the OCS by using a second Gy session;

the receiving a second answer sent by the OCS includes: receiving the second answer sent by the OCS by using the second Gy session;

the sending a first request to the OCS specifically includes: sending the first request to the OCS by using a first Gy session; and the receiving a first answer sent by the OCS includes: receiving the first answer sent by the OCS by using the first Gy session.

In the credit control method provided by the embodiment of the present invention, a PCEF receives a second quota allocated by an OCS to a second bearer and a credit pool identifier corresponding to a first bearer, and stores the second quota and a first quota in a same credit pool, so that the second bearer and the first bearer use the same credit pool. If the first bearer and the second bearer are in a same IP-CAN session, sharing of the credit pool between multiple IP-CAN bearers in the same IP-CAN Session is implemented. For example, the credit pool is shared between all IP-CAN bearers in the same IP-CAN Session; or the credit pool is shared between a default bearer and a part of dedicated bearers in the same IP-CAN Session; or the credit pool is shared between a part of dedicated bearers in the same IP-CAN Session. If the first bearer and the second bearer are in different IP-CAN sessions, sharing of the credit pool between the IP-CAN sessions is implemented. For example, all IP-CAN sessions of a same user share the credit pool; or a part of IP-CAN sessions of a same user share the credit pool.

Generally, a user corresponds to one or more public data network (Public Data Network, PDN) connections, where one PDN connection is an IP connectivity access network session (IP Connectivity Access Network Session, IP-CAN Session), and multiple IP-CAN bearers exist in one IP-CAN Session. In the embodiment of the present invention, the first bearer and the second bearer may be in a same IP-CAN Session, or in different IP-CAN Sessions.

In addition, both the first bearer and the second bearer are embodied as independent Gy sessions on a Gy interface, that is, the first Gy session corresponding to the first bearer and the second Gy session corresponding to the second bearer are different sessions; in other words, no matter whether bearers sharing the credit pool are in a same IP-CAN Session or in different IP-CAN Sessions, each of the bearers sharing the credit pool has an independent Gy session on the Gy interface. Alternatively, the first bearer and the second bearer are embodied as only one session on the Gy interface, that is, the first Gy session corresponding to the first bearer and the second Gy session corresponding to the second bearer are a same shared Gy session; in other words, no matter whether bearers sharing the credit pool are in a same IP-CAN Session or in different IP-CAN Sessions, the bearers sharing the credit pool have only one shared session on the Gy interface.

When the first Gy session and the second Gy session are different sessions, both the first request instructing to perform credit control on the first bearer and the second request instructing to perform credit control on the second bearer are initial credit control requests CCR-initial, and both the first answer corresponding to the first request and the second answer corresponding to the second request are initial credit control answers CCA-initial; otherwise, when the first Gy session and the second Gy session are a same shared Gy session, the first request instructing to perform credit control on the first bearer is an initial credit control request CCR-initial, and the second request instructing to perform credit control on the second bearer is an update credit control request CCR-Update; the first answer corresponding to the first request is an initial credit control answer CCA-initial, and the second answer corresponding to the second request is an update credit control answer CCA-Update.

The following describes the credit control method provided by the present invention in detail according to an interaction process between an OCS and a PCEF.

Figure 3:
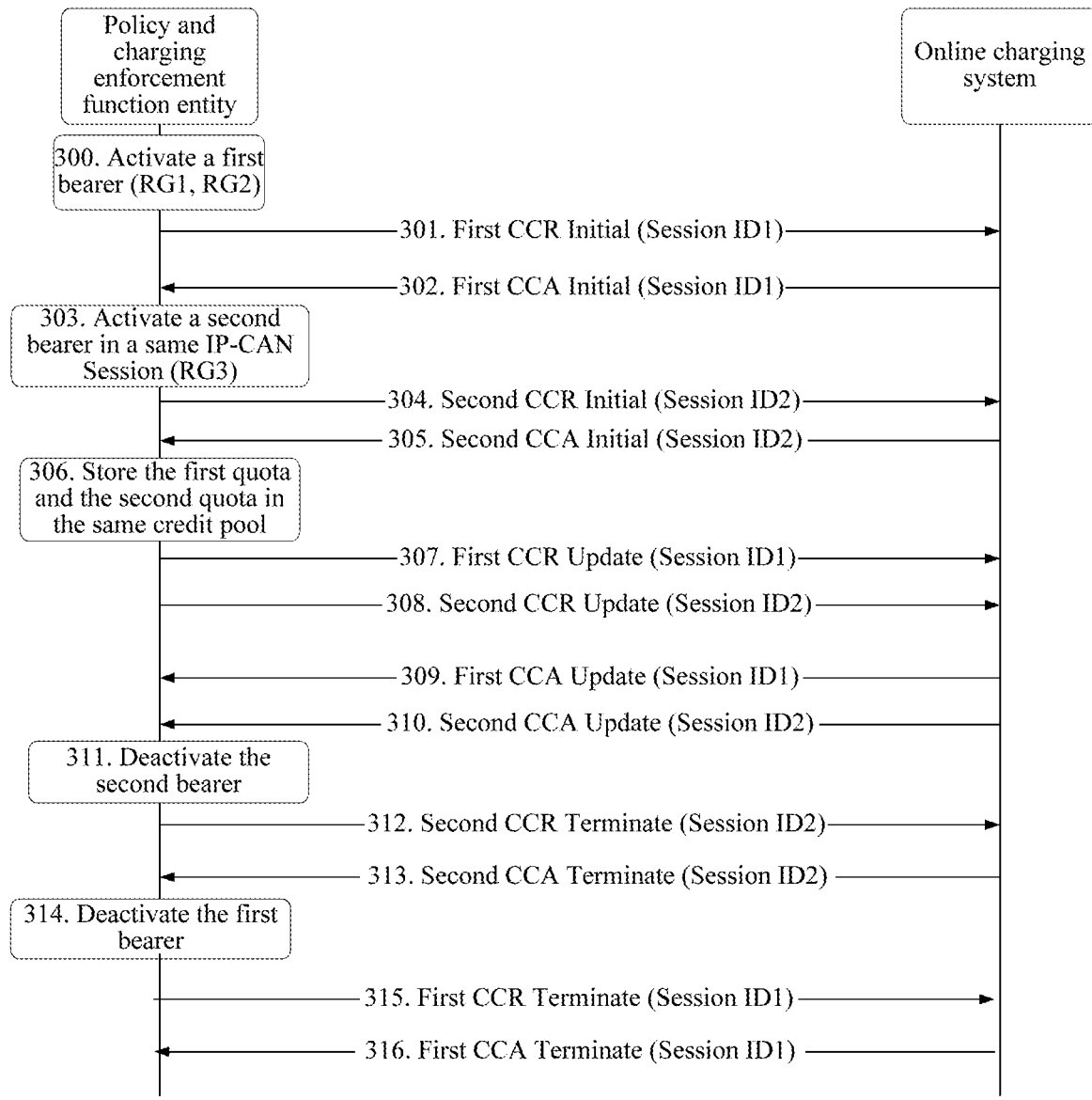
FIG. 3 is a signaling flowchart of Embodiment 3 of a credit control method according to the present invention.

FIG. 3 is a signaling flowchart of Embodiment 3 of a credit control method according to the present invention. In this embodiment, a first bearer and a second bearer belong to a same IP-CAN session, and a first Gy session corresponding to the first bearer and a second Gy session corresponding to the second bearer are different sessions that are independent of each other. Specifically, this embodiment includes the following steps:

300. A PCEF activates a first bearer.

Specifically, a user is online initially, and establishes a first bearer. A serving GPRS support node (Serving GPRS Support Node, SGSN) or a mobility management entity (Mobility Management Entity, MME) sends an activate request to the PCEF, and the PCEF activates the first bearer according to the activate request, where the first bearer is a default bearer (the SGSN/MME is not shown in the figure); or a user equipment in an online state establishes a first bearer when performing a new service, where the first bearer is a dedicated bearer (the SGSN/MME is not shown in the figure).

It is assumed that the first bearer bears two services, which respectively correspond to rating groups (Rating Group, RG) RG1 and RG2.

301. The PCEF sends a first CCR Initial message to an OCS by using a first Gy session.

The first Gy session may be represented, for example, by Session ID1. If the PCEF finds that online charging needs to be performed on the first bearer, the PCEF sends a first CCR Initial message to a corresponding OCS, where the first CCR Initial carries multiple services credit control (Multiple Services Credit Control, MSCC), so as to request quotas for the RG1 and RG2 of the first bearer, for example, a quota requested for the RG1 is MSCC1<RG1, RSU>, where the requested service unit (Requested-Service-Unit, RSU) indicates the number of quotas that the PCEF expects the OCS to deliver for the RG1.

Optionally, the first RRC Initial may further carry a capability negotiation field (Capability Negotiation IE) to negotiate with the OCS about a manner of using a credit pool, where the field may be a standard supported features (supported features) field, or may be a non-standard customized field. Specifically, the credit pool may be used in the following manners:

Manner 1: In the present invention, in a same IP-CAN Session, multiple IP-CAN bearers share the credit pool.

Manner 2: In the present invention, multiple IP-CAN Sessions of a same user share the credit pool.

The OCS and the PCEF may preset a manner of using the credit pool, that is, a default manner of using the credit pool, and in this case, it is unnecessary to carry the capability negotiation field in the first CCR Initial; otherwise, the PCEF may select a capability negotiation field flexibly according to an actual requirement and so on, so as to negotiate with the OCS about the manner of using the credit pool. For example, manner 1 is identified as 1, manner 2 is identified as 2, and manner 3 is identified as 3. If manner 2 is used, the PCEF sends the first CCR Initial, which carries the identifier of 2, to the OCS. Assuming that the OCS supports manner 2, the OCS returns the identifier of 2 when returning a first CCA Initial, indicating that the OCS agrees to use manner 2; otherwise, the OCS returns the identifier of 1 or 3, continuing to negotiate the manner of using the credit pool. The following describes in detail the present invention by using an example in which the first CCR initial carries a capability negotiation field.

302. The OCS sends a first CCA Initial to the PCEF by using the first Gy session.

After receiving the first CCR Initial, the OCS checks a balance of the user. If the balance is enough, the OCS supports the credit pool, and an application manner coincides with the capability negotiation field carried in the first CCR Initial, the OCS allocates a first quota to the first bearer, that is, allocates corresponding quotas to the RG1 and the RG2. Specifically, the OCS may allocate a quota according to a credit pool manner, carries the first quota and a credit pool identifier in the first CCA Initial, and sends the first CCA Initial to the PCEF.

Optionally, in this step, the OCS may also convert the first quota into a credit unit according to a preset policy, so that the PCEF, after receiving the credit unit corresponding to the first quota, injects the credit unit into the credit pool; or the OCS may also send the first CCA Initial, which carries an indication for converting the quota into a credit unit, for example, a multiplier (Multiplier), to the PCEF, so that the PCEF converts the first quota into the credit unit according to the multiplier indicated by the OCS, and then injects the credit unit into the credit pool. For example, a quota allocated to the RG1 is MSCC1 (RG1, GSU, G-S-U-Pool-Reference<Pool ID 1, Multiplier 10, Unit Type>), where the granted service unit (Granted-Service-Unit, GSU) indicates the number of quotas actually delivered for the RG1 by the OCS, the Pool ID1 indicates that the credit pool identifier is 1, and the Multiplier 10 indicates that a conversion factor is 10.

Specifically, it is assumed that the total number of quotas in the credit pool is S, that M1-Mn are conversion factors corresponding to RGs belonging to the credit pool, and that Q1-Qn are quotas allocated to RGs or RGs+SIDs belonging to the same credit pool. Therefore, $S=Q1 \times M1+Q2 \times M2+ Qn \times Mn$.

303. The PCEF activates a second bearer in a same IP-CAN Session.

For the specific activation process, reference may be made to the foregoing step 300, and details are not repeatedly described herein.

It is assumed that the second bearer bears a service, which corresponds to a rating group (Rating Group, RG) RG3.

304. The PCEF sends a second CCR Initial message to the OCS by using a second Gy session.

The second Gy session may be represented, for example, by Session ID2. In this embodiment, each bearer is embodied as a independent Gy session on a Gy interface. Therefore, in this step, the PCEF sends the second CCR Initial message on the Gy interface to the corresponding OCS according to a protocol, where the second CCR Initial carries MSCC to request a quota for the RG3 of the second bearer.

Optionally, the second CCR Initial may carry a capability negotiation field.

305. The OCS sends a second CCA Initial to the PCEF by using the second Gy session.

After receiving the second CCR Initial, the OCS determines whether the first bearer may share the credit pool with the second bearer. If the first bearer may share the credit pool with the second bearer, the user has enough balance, the OCS supports the credit pool, and the application manner coincides with the capability negotiation field carried in the second CCR Initial, the OCS allocates a second quota to the second bearer, that is, allocates a corresponding quota to the RG3. Specifically, the OCS may allocate the quota according to the credit pool manner, carries the second quota and a credit pool identifier in the second CCA Initial, and sends the second CCA Initial to the PCEF, where the credit pool identifier is a credit pool identifier corresponding to the first bearer.

Optionally, the OCS may convert the second quota into a credit unit; or may send a conversion indication to the PCEF, and the PCEF converts the second quota into a credit unit.

Specifically, it is assumed that the total number of consumed quotas is C, that M1-Mn are conversion factors corresponding to the RGs belonging to the credit pool, and that C1-Cn are quotas allocated to the RGs or RG+SIDs belonging to the same credit pool. Therefore, $C=C1 \times M1+ C2 \times M2+Cn \times Mn$.

306. The PCEF stores a first quota and a second quota in a same credit pool.

The PCEF stores the second quota and the first quota in the same credit pool, so that a service borne by the first bearer and a service borne by the second bearer share the credit pool, that is, the RG1, RG2, and RG3 share the credit pool. If the RG1 and RG2 consume quotas fast, the RG1 and RG2 may share the second quota with the RG3 after the first quota is consumed completely. Similarly, if the RG3 consumes a quota fast, the RG3 may share the first quota with the RG1 and RG2 after the second quota is consumed completely.

In this step, if the service borne by the first bearer also ends after the quotas in the credit pool are consumed completely, step 314 is performed to perform fee deduction; otherwise, if the service borne by the first bearer still needs to be continued, step 307 is performed to request new quotas for the RG1 and RG2 and deduct fees for the consumed quotas.

Similarly, in this step, if the service borne by the second bearer also ends after the quotas in the credit pool are consumed completely, step 311 is performed to perform fee deduction; otherwise, if the service borne by the second bearer still needs to be continued, step 308 is performed to request new quotas for the RG3 and deduct fees for the consumed quotas.

307. The PCEF sends a first CCR Update to the OCS by using the first Gy session.

The first Gy session may be represented, for example, by Session ID1. In this step, if the user performs a service in the foregoing step 306 and consumes the quotas in the credit pool completely, or if the user performs a service and consumes quotas, so that the remaining quotas in the credit pool reach a threshold specified by the protocol, the PCEF sends the first CCR Update to the OCS by using the first Gy session, so as to request a new quota for the service on the first bearer, where the first CCR Update carries quota consumption of the RG1 and RG2 of the first bearer. For example, the quota consumed by the RG2 is MSCC2 (RG2, RSU, USU, Reporting Reason=Pool Exhausted), where, the RSU indicates the number of quotas that the PCEF expects the OCS to deliver for the RG1 again, the used service unit (Used-Service-Unit, USU) indicates the number of consumed quotas, and the reporting reason (Reporting Reason) indicates that the quotas in the credit pool are consumed completely. The OCS performs real-time fee deduction according to the quota consumption of the RG1 and RG2 of the first bearer.

308. The PCEF sends a second CCR Update to the OCS by using the second Gy session.

The second Gy session may be represented, for example, by Session ID2. In this step, if the user performs a service in the foregoing step 306 and consumes the quotas in the credit pool completely, or if the user performs a service and consumes quotas, so that the remaining quotas in the credit pool reach a threshold specified by the protocol, the PCEF sends the second CCR Update to the OCS by using the second Gy session, so as to request a new quota for the service of the second bearer, where the second CCR Update carries quota consumption of the RG3 of the second bearer, for example, MSCC3 (RG2, RSU, USU, Reporting Reason=Pool Exhausted). The OCS performs real-time fee deduction according to the quota consumption of the RG3 of the second bearer.

It should be noted that the foregoing steps 307 and 308 may be executed simultaneously or in sequence, which is not limited by the present invention.

309. The OCS sends a first CCA Update to the PCEF by using the first Gy session.

The OCS continues to check the balance of the user, and if the balance is enough, the OCS reallocates a quota to the RG1 and RG2 of the first bearer, and sends the first CCA Update, which carries the newly allocated quota, to the PCEF.

310. The OCS sends a second CCA Update to the PCEF by using the second Gy session.

The OCS continues to check the balance of the user, and if the balance is enough, the OCS reallocates a quota to the RG3 of the second bearer, carries the newly allocated quota in the second CCA Update, and sends the second CCA Update to the PCEF.

Optionally, in steps 309 and 310, the OCS may convert the newly allocated quota into a credit unit before sending the quota; or may directly send the quota and a conversion indication to the PCEF, and the PCEF performs conversion between the quota and the credit unit.

Optionally, steps 309 and 310 may be executed simultaneously or in sequence, which is not limited by the present invention.

311. The PCEF deactivates the second bearer.

In this embodiment, the second bearer is specifically a dedicated bearer. Therefore, when the user stops using the service borne by the second bearer, or it is necessary to deactivate the second bearer due to service aging, the PCEF deactivates the second bearer. Generally, when the service borne by the dedicated bearer ends, the RG3 ends, but other services may be continued on the dedicated bearer. In this case, it is unnecessary to deactivate the second bearer. However, if the RG3 ends and the user is offline, or preset duration elapses after the service borne by the second bearer ends, the second bearer is deactivated.

312. The PCEF sends a second terminate credit control request (CCR Terminate) to the OCS by using the second Gy session.

The PCEF sends the second CCR Terminate, which carries the quota consumption of the RG3 of the second bearer, to the OCS, indicating that the service of the second bearer is stopped or quit, so as to instruct the OCS to perform fee deduction for the RG3 of the second bearer. For example, the quota consumed by the RG3 is MSCC3 (RG3, RSU, USU, Reporting Reason=FINAL), where the RSU indicates the number of quotas that the OCS requests for the RG3 again, and the USU indicates the reported number of quotas used last time when the user deactivates the second bearer and the reporting reason is deactivation.

It should be noted that the user is offline due to deactivation, and that requesting a quota again is useless. Therefore, the second CCR Terminate may carry the RSU, or may not carry the RSU.

313. The OCS sends a second terminate credit control answer (CCA Terminate) to the PCEF by using the second Gy session.

After the OCS performs fee deduction for the RG3 of the second bearer, the OCS sends the second CCA Terminate to the PCEF by using the second Gy session, indicating that the second bearer is deactivated, that is, the second Gy session is terminated successfully, and fee deduction for the quota consumption of the RG3 is successful.

314. The PCEF deactivates the first bearer.

Specifically, when the first bearer is a default bearer, if the user is offline, the PCEF deactivates the first bearer; otherwise, when the first bearer is a dedicated bearer, and the service on the bearer ends, or when it is necessary to deactivate the first bearer due to service aging, the PCEF deactivates the first bearer.

315. The PCEF sends a first CCR Terminate to the OCS by using the first Gy session.

The PCEF carries the quota consumption of the RG1 and RG2 of the first bearer in the first CCR Terminate, and sends the first CCR Terminate to the OCS, indicating that the service on the first bearer is stopped or quit, so as to instruct the OCS to perform fee deduction for the RG1 and RG2 of the first bearer.

316. The OCS sends a first CCA Terminate to the PCEF by using the first Gy session.

After the OCS performs fee deduction for the RG1 and RG2 of the first bearer, the OCS sends the first CCA Terminate to the PCEF by using the first Gy session, indicating that the first bearer is deactivated, that is, the first Gy session is terminated successfully and fee deduction for the quota consumption of the RG1 and RG2 is successful.

It should be noted that in this step, the fee deduction is performed by the OCS for the total quota consumption of the RG1 and RG2 in step 307 and step 315.

In addition, it should also be noted that the foregoing steps 311-313 are a process of fee deduction for the service borne by the second bearer, and that the foregoing steps 314-316 are a process of fee deduction for the service borne by the first bearer. If both the first bearer and the second bearer are dedicated bearers, and the second bearer is established after the first bearer is established, there is no strict sequence for execution processes of the foregoing steps 311-313 and steps 314-316, that is, steps 311-313 may be first executed, and then steps 314-316 may be executed, or steps 314-316 may be first executed, and then steps 311-313 may be executed; otherwise, if the first bearer is a default bearer and the second bearer is a dedicated bearer, steps 311-313 are first executed, and then steps 314-316 are executed, or steps 314-316 are first executed, and in this case, after the default bearer is deactivated, other dedicated bearers that belong to the same IP-CAN Session as the default bearer are deactivated forcibly.

In this embodiment, the first Gy session corresponding to the first bearer and the second Gy session corresponding to the second bearer are independent sessions. Therefore, when a bearer is deactivated, no matter whether the bearer is a default bearer or a dedicated bearer, the PCEF sends a CCR Terminate to the OCS, and correspondingly, an answer fed back by the OCS to the PCEF is also a CCA Terminate.

Figure 4:
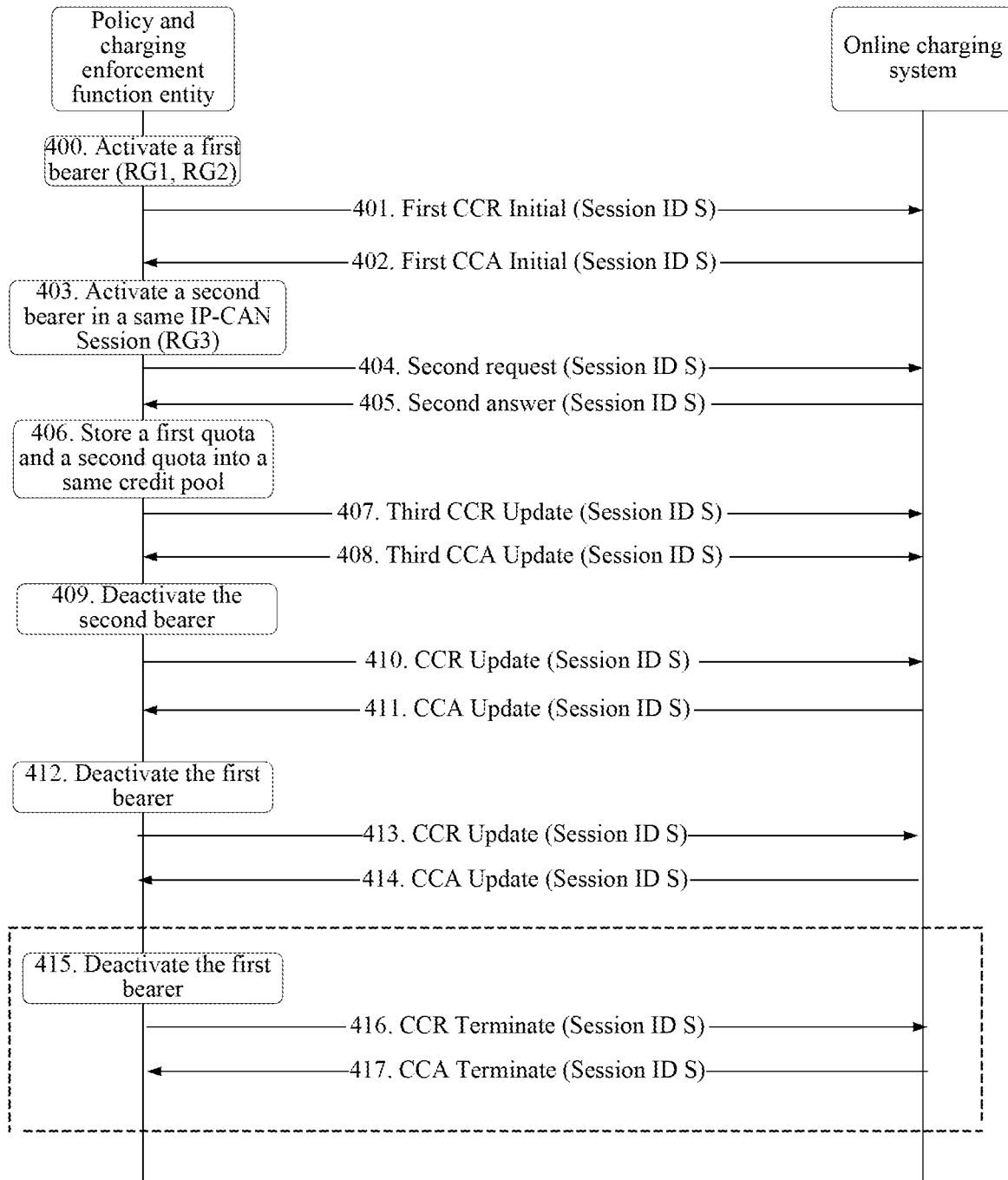
FIG. 4 is a signaling flowchart of Embodiment 4 of a credit control method according to the present invention.

FIG. 4 is a signaling flowchart of Embodiment 4 of a credit control method according to the present invention. In this embodiment, a first bearer and a second bearer belong to a same IP-Can session, and a first Gy session corresponding to the first bearer and a second Gy session corresponding to the second bearer are a same shared session. Specifically, this embodiment includes the following steps:

400. A PCEF activates a first bearer.

401. The PCEF sends a first CCR Initial message to an OCS by using a shared Gy session.

The shared Gy session may be represented, for example, by Session ID S.

402. The OCS sends a first CCA Initial to the PCEF by using the shared Gy session.

403. The PCEF activates a second bearer in a same IP-CAN Session.

For the foregoing steps 400-403, reference may be made to the foregoing steps 300-303 in FIG. 3, and details are not repeatedly described herein.

404. The PCEF sends a second request to the OCS by using the shared Gy session.

This step is different from the foregoing step 304 in FIG. 3. In the foregoing step 304 in FIG. 3, the PCEF sends a second request message to the corresponding OCS according to a protocol, where the second request is specifically a CCR Initial message. However, in this step, the PCEF does not perform processing according to a definition of a standard protocol, and the sent second request is specifically a CCR Update message, where the second request carries MSCC to request a quota for an RG3 of the second bearer.

405. The OCS sends a second answer to the PCEF by using the shared Gy session.

This step is different from the foregoing step 305 in FIG. 3. In the foregoing step 305 in FIG. 3, the second answer sent by the OCS is specifically a CCA Initial message, but in this step, the second answer is specifically a CCA Update message.

406. The PCEF stores a first quota and a second quota in a same credit pool.

For details, reference may be made to the foregoing step 306 in FIG. 3, and details are not repeatedly described herein.

In this step, if a service borne by the first bearer also ends after quotas in the credit pool are consumed completely, step 412 is performed to perform fee deduction; otherwise, if the service borne by the first bearer still needs to be continued, step 407 is performed to request new quotas for an RG1 and an RG2.

Similarly, in this step, if a service borne by the second bearer also ends after the quotas in the credit pool are consumed completely, step 409 is executed to perform fee deduction; otherwise, if the service borne by the second bearer still needs to be continued, step 407 is performed to request a new quota for an RG3.

407. The PCEF sends a third CCR Update to the OCS by using the shared Gy session.

In this step, if a user performs a service in the foregoing step 406 and consumes the quotas in the credit pool completely, or if a user performs a service and consumes quotas, so that the remaining quotas in the credit pool reach a threshold specified by the protocol, for example, the protocol specifies that the number of credit units in the credit pool cannot exceed 5, when 5 credit units remain in the credit pool, the PCEF sends the third CCR Update to the OCS by using the shared Gy session, so as to request new quotas for the service on the first bearer and the service of the second bearer, where the third CCR Update carries quotas consumed by the first bearer and second bearer, that is, carries quota consumption of the RG1, RG2, and RG3.

408. The OCS sends a third CCA Update to the PCEF by using the shared Gy session.

After the OCS reallocates quotas to the RG1 and RG2 of the first bearer and the RG3 of the second bearer, the OCS carries the newly allocated quotas in the third CCA Update, and sends the third CCA Update to the PCEF.

409. The PCEF deactivates the second bearer.

In this embodiment, the second bearer is specifically a dedicated bearer. Therefore, when the user stops using the service borne by the second bearer and the user is offline or the service is aged, the PCEF deactivates the second bearer. Generally, when the service borne by the dedicated bearer ends, that is, when the RG3 ends, other services may be continued on the dedicated bearer. In this case, it is unnecessary to deactivate the second bearer. However, if the RG3 ends and the user is offline, or preset duration elapses after the service borne by the second bearer ends, the second bearer is deactivated.

410. The PCEF sends a CCR Update to the OCS by using the shared Gy session.

The PCEF carries the quota consumption of the RG3 of the second bearer in the CCR Update, and sends the CCR Update to the OCS, indicating that the service of the second bearer is stopped or quit, so as to instruct the OCS to perform fee deduction for the RG3 of the second bearer.

411. The OCS sends a CCA Update to the PCEF by using the shared Gy session.

After the OCS performs fee deduction for the RG3 of the second bearer, the OCS sends the CCA Update to the PCEF by using the shared Gy session, indicating that the second bearer is deactivated, that is, fee deduction for the quota consumption of the RG3 is successful.

412. The PCEF deactivates the first bearer.

When the first bearer is a dedicated bearer, and the service on the bearer ends, or when it is necessary to deactivate the first bearer due to service aging, the PCEF deactivates the first bearer.

413. The PCEF sends a CCR Update to the OCS by using the shared Gy session.

The PCEF carries the quota consumption of the RG1 and RG2 of the first bearer in the CCR Update, and sends the CCR Update to the OCS, indicating that the service on the first bearer is stopped or quit, so as to instruct the OCS to perform fee deduction for the RG1 and RG2 of the first bearer.

414. The OCS sends a CCA Update to the PCEF by using the shared Gy session.

After the OCS performs fee deduction for the RG1 and RG2 of the first bearer, the OCS sends the CCA Update to the PCEF by using the shared Gy session, indicating that the first bearer is deactivated, that is, fee deduction for the quota consumption of the RG1 and RG2 is successful.

It should be noted that the foregoing steps 409-411 are a process of fee deduction for the service borne by the second bearer, and that the foregoing steps 412-414 are a process of fee deduction for the service borne by the first bearer. Both the first bearer and the second bearer are dedicated bearers, and the second bearer is established after the first bearer is established. Therefore, there is no strict sequence for execution processes of the foregoing steps 409-411 and steps 412-414, that is, steps 409-411 may be first executed, and then steps 412-414 may be executed, or steps 412-414 may be first executed, and then steps 409-411 may be executed.

In addition, in this embodiment, if the first bearer is a default bearer, the second bearer is a dedicated bearer, and the first bearer is deactivated first, steps 415-418 are executed, with no need to execute steps 409-411.

415. The PCEF deactivates the first bearer.

Specifically, if the first bearer is a default bearer, and the bearer is deactivated, other dedicated bearers belonging to the same IP-CAN Session as the default bearer are deactivated forcibly.

416. The PCEF sends a CCR Terminate to the OCS by using the shared Gy session.

The PCEF carries the quota consumption of the RG1 and RG2 of the first bearer and the RG3 of the second bearer in the CCR Terminate, and sends the CCR Terminate to the OCS, indicating that the service on the first bearer or second bearer is stopped or quit, so as to instruct the OCS to perform fee deduction for the RG1 and RG2 of the first bearer and the RG3 of the second bearer.

417. The OCS sends a CCA Terminate to the PCEF by using the shared Gy session.

After the OCS performs fee deduction for the RG1 and RG2 of the first bearer and the RG3 of the second bearer, the OCS sends the CCA Terminate to the PCEF by using the shared Gy session, indicating that the first bearer is deactivated, that is, fee deduction for the quota consumption of the RG1 and RG2 is successful.

In this embodiment, the first Gy session corresponding to the first bearer and the second Gy session corresponding to the second bearer are the same shared session. Therefore, when a bearer is deactivated, if the bearer is a dedicated bearer, the PCEF sends a CCR Update to the OCS, where the CCR Update is used to instruct to deactivate the dedicated bearer, and correspondingly, an answer fed back by the OCS to the PCEF is also a CCA Update; otherwise, if the bearer is a default bearer, a CCR Terminate is sent, instructing to deactivate the default bearer, and correspondingly, an answer fed back by the OCS to the PCEF is also a CCA Terminate.

Figure 5:
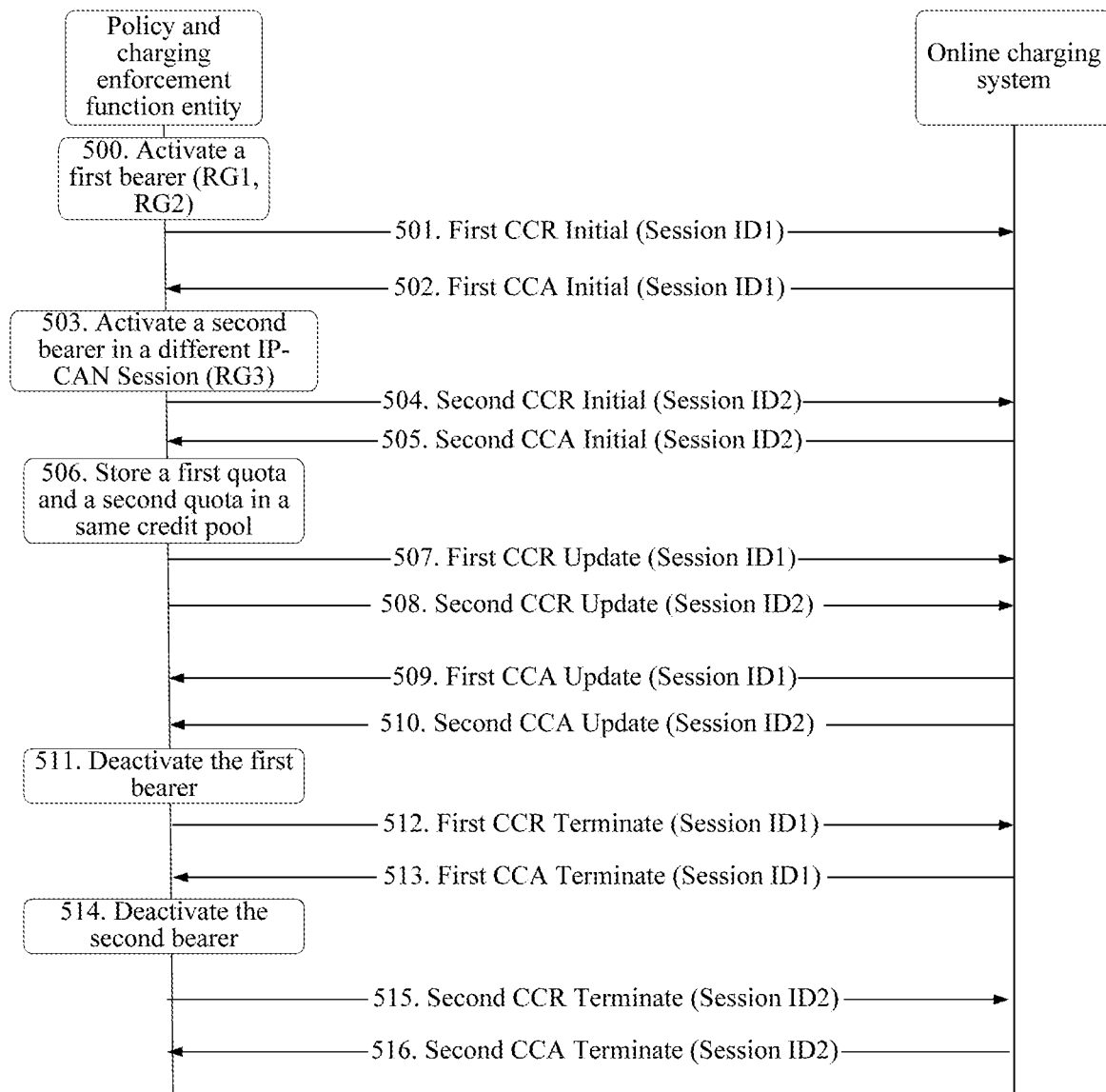
FIG. 5 is a signaling flowchart of Embodiment 5 of a credit control method according to the present invention.

FIG. 5 is a signaling flowchart of Embodiment 5 of a credit control method according to the present invention. In this embodiment, a first bearer and a second bearer are in different IP-Can sessions, and a first Gy session corresponding to the first bearer and a second Gy session corresponding to the second bearer are different sessions. Specifically, this embodiment includes the following steps:

500. A PCEF activates a first bearer.

501. The PCEF sends a first CCR Initial message to an OCS by using a first Gy session.

502. The OCS sends a first CCA Initial to the PCEF by using the first Gy session.

For the foregoing steps 500-502, reference may be made to the foregoing steps 300-302 in FIG. 3, and details are not repeatedly described herein.

503. The PCEF activates a second bearer in a different IP-CAN Session.

Specifically, when a same user initiates a new PDN connection, the PCEF activates a default bearer of the new PDN connection, and the default bearer is the second bearer; or when a new dedicated bearer is established in another IP-CAN Session except the IP-CAN Session of the first bearer, the PCEF activates the dedicated bearer, and the dedicated bearer is the second bearer.

504. The PCEF sends a second CCR Initial message to the OCS by using a second Gy session.

505. The OCS sends a second CCR Initial message to the PCEF by using the second Gy session.

506. The PCEF stores a first quota and a second quota in a same credit pool.

507. The PCEF sends a first CCR Update to the OCS by using the first Gy session.

508. The PCEF sends a second CCR Update to the OCS by using the second Gy session.

509. The OCS sends a first CCA Update to the PCEF by using the first Gy session.

510. The OCS sends a second CCA Update to the PCEF by using the second Gy session.

For the foregoing steps 504-510, reference may be made to the foregoing steps 304-310 in FIG. 3, and details are not repeatedly described herein.

511. The PCEF deactivates the first bearer.

If the first bearer is a default bearer, when the user going offline initiates a PDN connection deactivate request, the PCEF deactivates the first bearer; otherwise, if the first bearer is a dedicated bearer, when the user stops using a service borne by the first bearer, or when it is necessary to deactivate the first bearer due to service aging, the PCEF deactivates the first bearer.

512. The PCEF sends a first CCR Terminate to the OCS by using the first Gy session.

513. The OCS sends a first CCA Terminate to the PCEF by using the first Gy session.

For steps 512 and 513, reference may be made to the foregoing steps 315 and 316 in FIG. 3, and details are not repeatedly described herein.

514. The PCEF deactivates the second bearer.

If the second bearer is a default bearer, when the user is offline, the PCEF deactivates the second bearer; otherwise, if the second bearer is a dedicated bearer, when the user stops using a service borne by the second bearer, or when it is necessary to deactivate the second bearer due to service aging, the PCEF deactivates the second bearer.

515. The PCEF sends a second CCR Terminate to the OCS by using the second Gy session.

516. The OCS sends a second CCA Terminate to the PCEF by using the second Gy session.

For steps 515 and 516, reference may be made to the foregoing steps 312 and 313 in FIG. 3, and details are not repeatedly described herein.

Figure 6:
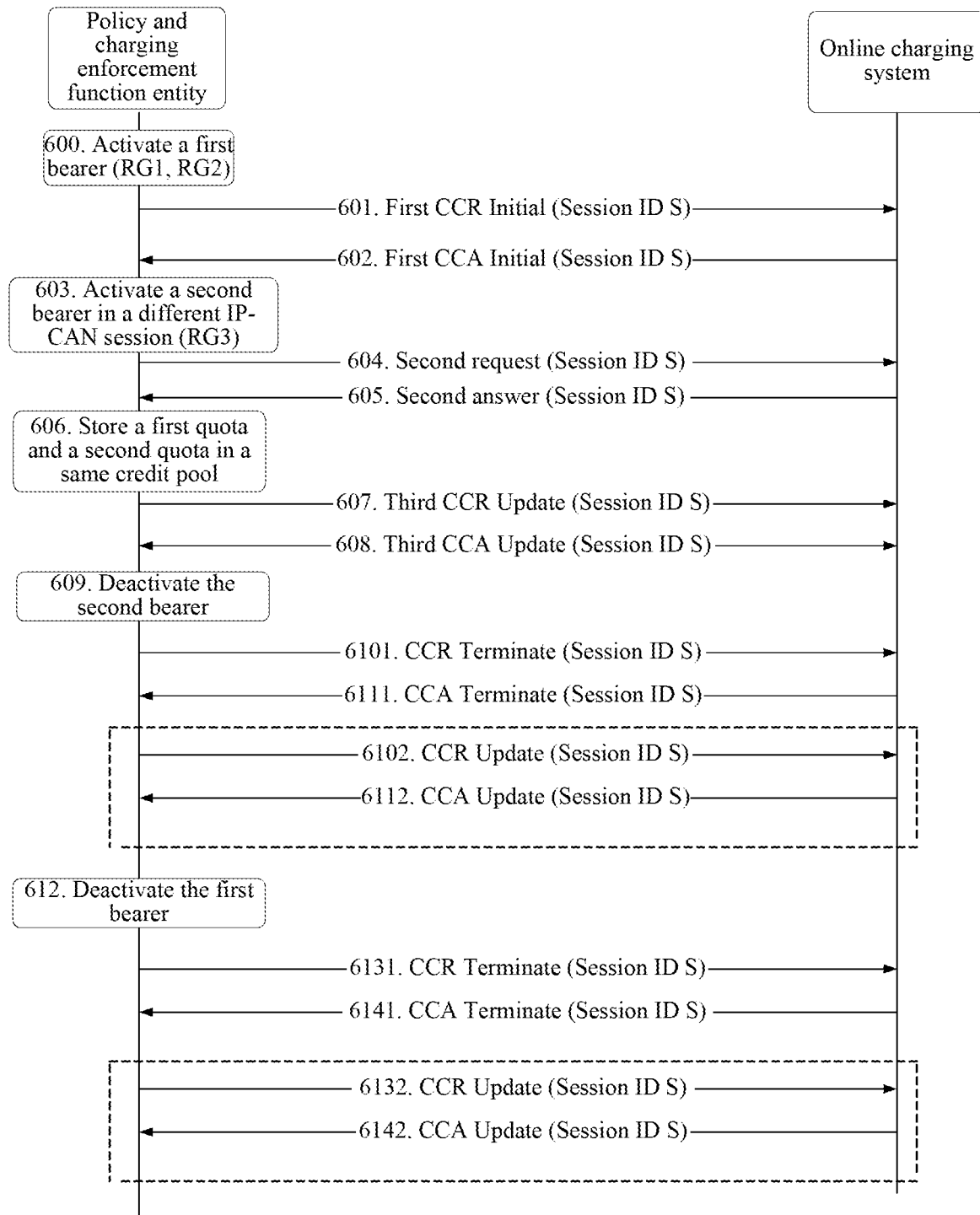
FIG. 6 is a signaling flowchart of Embodiment 6 of a credit control method according to the present invention.

FIG. 6 is a signaling flowchart of Embodiment 6 of a credit control method according to the present invention. In this embodiment, a first bearer and a second bearer are in different IP-Can sessions, and a first Gy session corresponding to the first bearer and a second Gy session corresponding to the second bearer are a same shared session. Specifically, this embodiment includes the following steps:

600. A PCEF activates a first bearer.

601. The PCEF sends a first CCR Initial message to an OCS by using a shared Gy session.

602. The OCS sends a first CCA Initial to the PCEF by using the shared Gy session.

For the foregoing steps 600-603, reference may be made to the foregoing steps 300-303 in FIG. 3, and details are not repeatedly described herein.

603. The PCEF activates a second bearer in a different IP-CAN Session.

Specifically, when a same user initiates a new PDN connection, the PCEF activates a default bearer of the new PDN connection, and the default bearer is the second bearer; or when a new dedicated bearer is established in another IP-CAN Session except the IP-CAN Session of the first bearer, the PCEF activates the dedicated bearer, and the dedicated bearer is the second bearer.

604. The PCEF sends a second request to the OCS by using the shared Gy session.

605. The OCS sends a second answer to the PCEF by using the shared Gy session.

606. The PCEF stores a first quota and a second quota in a same credit pool.

In this step, if a service borne by the first bearer also ends after quotas in the credit pool are consumed completely, step 612 is executed to perform fee deduction; otherwise, if the service borne by the first bearer still needs to be continued, step 607 is performed to request new quotas for an RG1 and an RG2.

Similarly, in this step, if a service borne by the second bearer also ends after the quotas in the credit pool are consumed completely, step 609 is executed to perform fee deduction; otherwise, if the service borne by the second bearer still needs to be continued, step 607 is performed to request a new quota for an RG3.

607. The PCEF sends a third CCR Update to the OCS by using the shared Gy session.

608. The OCS sends a third CCA Update to the PCEF by using the shared Gy session.

For the foregoing steps 604-608, reference may be made to the foregoing steps 404-408 in FIG. 4, and details are not repeatedly described herein.

609. The PCEF deactivates the second bearer.

If the second bearer is a default bearer, when the user going offline initiates a PDN connection deactivate request, the PCEF deactivates the second bearer; otherwise, if the second bearer is a dedicated bearer, when the user stops using the service borne by the first bearer, or when it is necessary to deactivate the second bearer due to service aging, the PCEF deactivates the second bearer.

Specifically, if the second bearer is a default bearer, steps 6101 and 6111 are executed; otherwise, if the second bearer is a dedicated bearer, steps 6102 and 6112 are executed, as shown by a dashed-line block in the FIG. 6.

6101. The PCEF sends a CCR Terminate to the OCS by using the shared Gy session.

6111. The OCS sends a CCA Terminate to the PCEF by using the shared Gy session.

6102. The PCEF sends a CCR Update to the OCS by using the shared Gy session.

6112. The OCS sends a CCA Update to the PCEF by using the shared Gy session.

612. The PCEF deactivates the first bearer.

If the first bearer is a default bearer, when the user going offline initiates a PDN connection deactivate request, the PCEF deactivates the first bearer; otherwise, if the first bearer is a dedicated bearer, when the user stops using the service borne by the first bearer, or when it is necessary to deactivate the first bearer due to service aging, the PCEF deactivates the first bearer.

Specifically, if the first bearer is a default bearer, steps 6131 and 6141 are performed; otherwise, if the first bearer is a dedicated bearer, steps 6132 and 6142 are performed, as shown by a dashed-line block in the figure.

6131. The PCEF sends a first CCR Terminate to the OCS by using the shared Gy session.

6141. The OCS sends a first CCA Terminate to the PCEF by using the shared Gy session.

6132. The PCEF sends a CCR Update to the OCS by using the shared Gy session.

6142. The OCS sends a CCA Update to the PCEF by using the shared Gy session.

In this embodiment, the first Gy session corresponding to the first bearer and the second Gy session corresponding to the second bearer are the same shared session. Therefore, when a bearer is deactivated, if the bearer is a dedicated bearer, the PCEF sends a CCR Update to the OCS, where the CCR Update is used to instruct to deactivate the dedicated bearer; otherwise, if the bearer is a default bearer, a CCR Terminate is sent, instructing to deactivate the default bearer.

Figure 7:
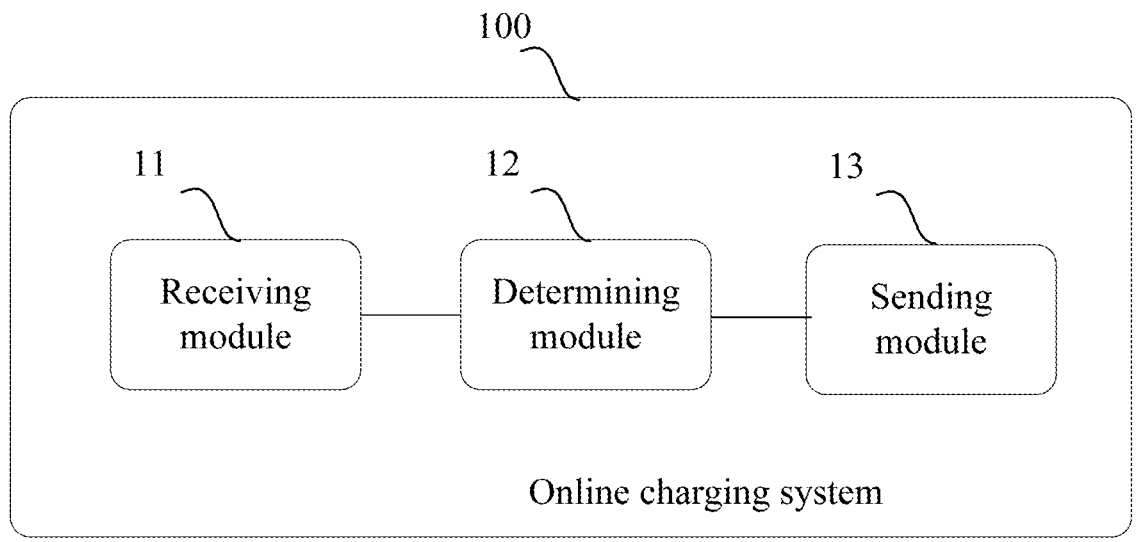
FIG. 7 is a schematic structural diagram of Embodiment 1 of an online charging system according to the present invention.

FIG. 7 is a schematic structural diagram of Embodiment 1 of an online charging system according to the present invention. The online charging system provided by this embodiment is an apparatus embodiment corresponding to the embodiment in FIG. 1 of the present invention. A specific implementation process is not repeatedly described herein. Specifically, an online charging system 100 provided by this embodiment specifically includes:

a receiving module 11, configured to receive a second request sent by a policy and charging enforcement function entity PCEF, where the second request instructs to perform credit control on a second bearer;

a determining module 12, configured to determine, according to the second request, whether a service borne by the second bearer may share a credit pool with a service borne by a first bearer, where the second bearer is established after the first bearer is established; and a sending module 13, configured to: if the determining module 12 determines that the service borne by the second bearer may share the credit pool with the service borne by the first bearer, send a second answer to the PCEF, where the second answer carries a credit pool identifier corresponding to the first bearer, so that the service borne by the first bearer shares the credit pool with the service borne by the second bearer.

In the online charging system provided by the embodiment of the present invention, if it is determined that a service borne by a second bearer may share a credit pool with a service borne by a first bearer, a second quota allocated to the second bearer and a credit pool identifier corresponding to the first bearer are sent to a PCEF, so that the PCEF stores the second quota and a first quota in a same credit pool, so that the second bearer and the first bearer use the same credit pool. If the first bearer and the second bearer are in a same IP-CAN session, sharing of the credit pool between multiple IP-CAN bearers in the same IP-CAN Session is implemented. For example, the credit pool is shared between all IP-CAN bearers in the same IP-CAN Session; or the credit pool is shared between a default bearer and a part of dedicated bearers in the same IP-CAN Session; or the credit pool is shared between a part of dedicated bearers in the same IP-CAN Session. If the first bearer and the second bearer are in different IP-CAN sessions, sharing of the credit pool between the IP-CAN sessions is implemented. For example, all IP-CAN sessions of a same user share the credit pool; or a part of IP-CAN sessions of a same user share the credit pool.

Further, the receiving module 11 is further configured to receive a first request sent by the PCEF, where the first request instructs to perform credit control on the first bearer; and the sending module 13 is further configured to send a first answer to the PCEF, where the first answer carries the credit pool identifier corresponding to the first bearer.

Figure 8:
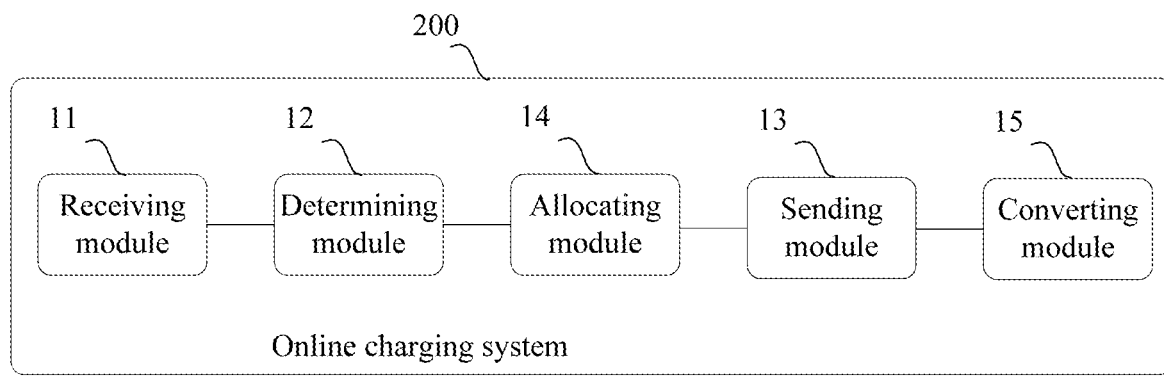
FIG. 8 is a schematic structural diagram of Embodiment 2 of an online charging system according to the present invention.

FIG. 8 is a schematic structural diagram of Embodiment 2 of an online charging system according to the present invention. As shown in FIG. 8, an online charging system 200 of this embodiment, on a basis of the structure of the apparatus in FIG. 7, further includes:

an allocating module 14, configured to allocate a second quota to the second bearer.

The sending module 13 is configured to send a second answer to the PCEF, where the second answer carries the second quota and the credit pool identifier corresponding to the first bearer, so that the PCEF stores the second quota in a credit pool corresponding to the credit pool identifier that corresponds to the first bearer, so that the service borne by the first bearer shares the credit pool with the service borne by the second bearer.

Further, the allocating module 14 is configured to allocate a first quota to the first bearer; and the sending module 13 is further configured to send a first answer to the PCEF, where the first answer carries the first quota and the credit pool identifier corresponding to the first bearer.

Further, the receiving module 11 is specifically configured to receive the second request sent by the policy and charging enforcement function entity PCEF by using a second Gy session;

the sending module 13 is specifically configured to send the second answer to the PCEF by using the second Gy session;

the receiving module 11 is further configured to receive the second request sent by the policy and charging enforcement function entity PCEF by using a first Gy session; and the sending module 13 is specifically configured to send the first answer to the PCEF by using the first Gy session.

Further, the first Gy session and the second Gy session are different Gy sessions; or the first Gy session and the second Gy session are a same shared Gy session.

Further, if the first Gy session and the second Gy session are different sessions, both the first request and the second request are initial credit control requests CCR-initial, and both the first answer and the second answer are initial credit control answers CCA-initial.

Further, if the first Gy session and the second Gy session are a same shared Gy session, the first request is an initial credit control request CCR-initial, and the second request is an update credit control request CCR-Update; and the first answer is an initial credit control answer CCA-initial, and the second request is an update credit control answer CCA-Update.

Further, if the first Gy session and the second Gy session are different Gy sessions, the receiving module 11 is further configured to: receive a first update credit control request sent by the PCEF by using the first Gy session, where the first update credit control request carries a quota consumed by the first bearer; and receive a second update credit control request sent by the PCEF by using the second Gy session, where the second update credit control request carries a quota consumed by the second bearer; and the sending module 13 is further configured to send a first update credit control answer to the PCEF by using the first Gy session, where the first update credit control answer carries a quota newly allocated to the first bearer; and send a second update credit control answer to the PCEF by using the second Gy session, where the second update credit control answer carries a quota newly allocated to the second bearer.

Further, if the first Gy session and the second Gy session are a same shared Gy session, the receiving module 11 is further configured to: receive a third update credit control request sent by the PCEF by using the shared Gy session, where the third update credit control request carries quotas consumed by the first bearer and the second bearer; and the sending module 13 is further configured to send a third update credit control answer to the PCEF by using the shared Gy session, where the third update credit control answer carries quotas newly allocated to the first bearer and the second bearer.

Further, the first bearer and the second bearer belong to a same Internet Protocol connectivity access network session IP-CAN session.

Further, the first bearer belongs to a first IP-CAN session, and the second bearer belongs to a second IP-CAN session, where the first IP-CAN session and the second IP-CAN session are different.

As shown in FIG. 8, further, the online charging system 200 further includes:

a converting module 15, configured to convert the second quota into a credit unit.

Further, the receiving module 11 is further configured to receive a capability negotiation request sent by the PCEF, where the capability negotiation request carries a capability negotiation information element (IE) indicating a credit pool application manner; and the sending module 13 is further configured to send a capability negotiation field answer to the PCEF.

Figure 9:
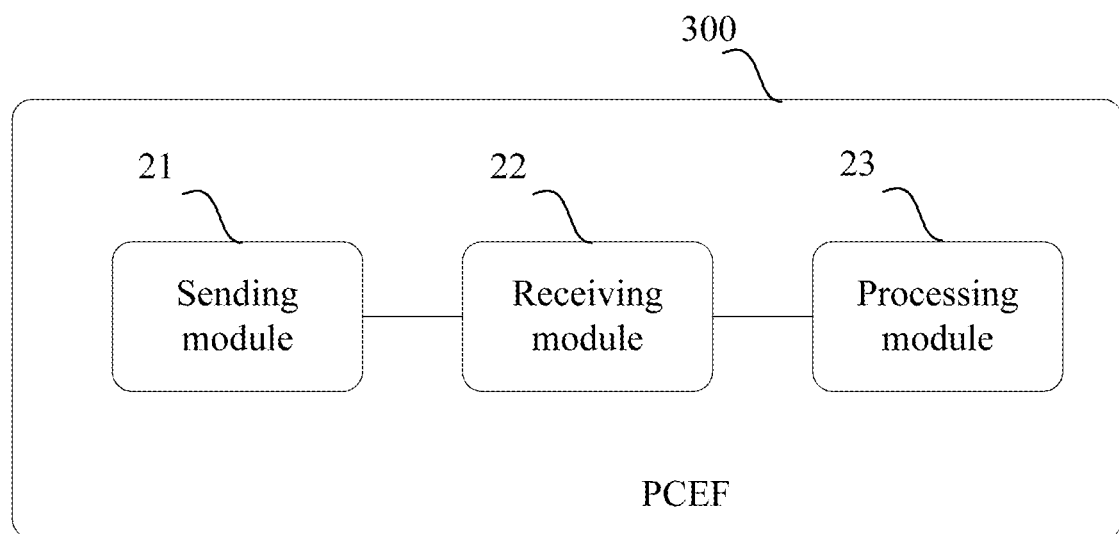
FIG. 9 is a schematic structural diagram of Embodiment 1 of a policy and charging enforcement function entity PCEF according to the present invention.

FIG. 9 is a schematic structural diagram of Embodiment 1 of a policy and charging enforcement function entity PCEF according to the present invention. The PCEF provided by this embodiment is an apparatus embodiment corresponding to the embodiment in FIG. 2 of the present invention. A specific implementation process is not repeatedly described herein. Specifically, a PCEF 300 provided by this embodiment specifically includes:

a sending module 21, configured to send a second request to an online charging system OCS, where the second request instructs to perform credit control on a second bearer;

a receiving module 22, configured to receive a second answer sent by the OCS, where the second answer carries a second quota and a credit pool identifier corresponding to a first quota of a first bearer, where the second quota is a quota allocated by the OCS to the second bearer, and the second bearer is established after the first bearer is established; and a processing module 23, configured to store the second quota and the first quota in a same credit pool, so that a service borne by the first bearer shares the credit pool with a service borne by the second bearer.

In the PCEF provided by the embodiment of the present invention, a second quota allocated by an OCS to a second bearer and a credit pool identifier corresponding to a first bearer are received, and the second quota and a first quota are stored in a same credit pool, so that the second bearer and the first bearer use the same credit pool. If the first bearer and the second bearer are in a same IP-CAN session, sharing of the credit pool between multiple IP-CAN bearers in the same IP-CAN Session is implemented. For example, the credit pool is shared between all IP-CAN bearers in the same IP-CAN Session; or the credit pool is shared between a default bearer and a part of dedicated bearers in the same IP-CAN Session; or the credit pool is shared between a part of dedicated bearers in the same IP-CAN Session. If the first bearer and the second bearer are in different IP-CAN sessions, sharing of the credit pool between the IP-CAN sessions is implemented. For example, all IP-CAN sessions of a same user share the credit pool; or a part of IP-CAN sessions of a same user share the credit pool.

Further, the sending module 21 is further configured to send a first request to the OCS, where the first request instructs to perform credit control on the first bearer; and the receiving module 22 is further configured to receive a first answer sent by the OCS, where the first answer carries the first quota and the credit pool identifier corresponding to the first quota of the first bearer.

Further, the sending module 21 is specifically configured to send the second request to the OCS by using a second Gy session;

the receiving module 22 is specifically configured to receive the second answer sent by the OCS by using the second Gy session;

the sending module 21 is further configured to send the first request to the OCS by using a first Gy session; and the receiving module 22 is further configured to receive the first answer sent by the OCS by using the first Gy session.

Further, the first Gy session and the second Gy session are different Gy sessions; or the first Gy session and the second Gy session are a same shared Gy session.

Further, if the first Gy session and the second Gy session are different sessions, both the first request and the second request are initial credit control requests CCR-initial, and both the first answer and the second answer are initial credit control answers CCA-initial.

Further, if the first Gy session and the second Gy session are a same shared Gy session, the first request is an initial credit control request CCR-initial, and the second request is an update credit control request CCR-Update; and the first answer is an initial credit control answer CCA-initial, and the second request is an update credit control answer CCA-Update.

Further, if the first Gy session and the second Gy session are different Gy sessions, the sending module 21 is further configured to: send a first update credit control request to the OCS by using the first Gy session, where the first update credit control request carries a quota consumed by the first bearer; and send a second update credit control request to the OCS by using the second Gy session, where the second update credit control request carries a quota consumed by the second bearer; and the receiving module 22 is further configured to receive a first update credit control answer sent by the OCS by using the first Gy session where the first update credit control answer carries a quota newly allocated to the first bearer; and receive a second update credit control answer sent by the OCS by using the second Gy session, where the second update credit control answer carries a quota newly allocated to the second bearer.

Further, if the first Gy session and the second Gy session are a same shared Gy session, the sending module 21 is further configured to: send a third update credit control request to the OCS by using the shared Gy session, where the third update credit control request carries quotas consumed by the first bearer and the second bearer; and the receiving module 22 is further configured to receive a third update credit control answer sent by the OCS by using the shared Gy session, where the third update credit control answer carries quotas newly allocated to the first bearer and the second bearer.

Further, the first bearer and the second bearer belong to a same Internet Protocol connectivity access network session IP-CAN session.

Further, the first bearer belongs to a first IP-CAN session, and the second bearer belongs to a second IP-CAN session, where the first IP-CAN session and the second IP-CAN session are different.

Figure 10:
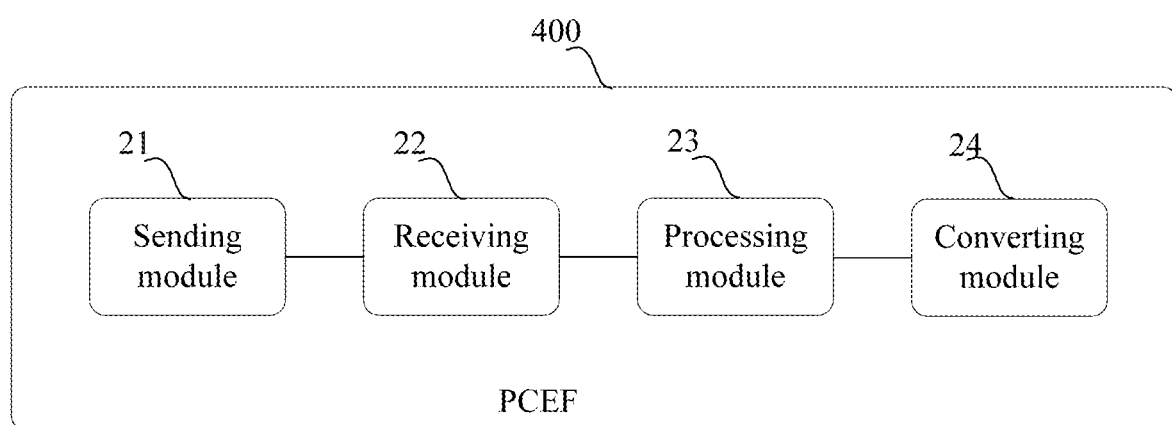
FIG. 10 is a schematic structural diagram of Embodiment 2 of a policy and charging enforcement function entity PCEF according to the present invention.

FIG. 10 is a schematic structural diagram of Embodiment 2 of a policy and charging enforcement function entity PCEF according to the present invention. As shown in FIG. 10, a PCEF 400 provided by this embodiment, on the basis of the structure of the apparatus shown in FIG. 9, further includes:

a converting module 24, configured to convert the second quota into a credit unit.

Further, the sending module 21 is further configured to send a capability negotiation request to the OCS, where the capability negotiation request carries a capability negotiation information element (IE) indicating a credit pool application manner; and the receiving module 22 is further configured to receive a capability negotiation field answer sent by the OCS.

Figure 11:
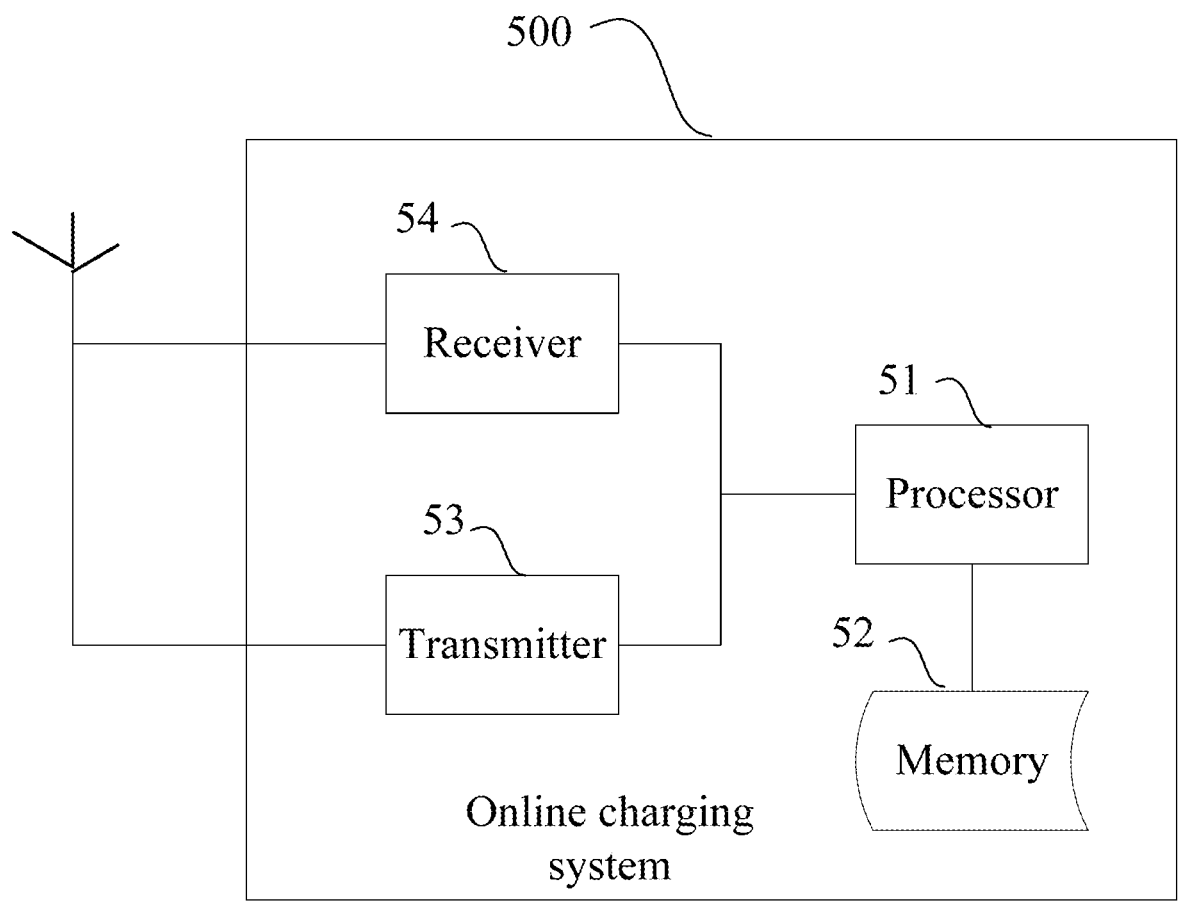
FIG. 11 is a schematic structural diagram of Embodiment 3 of an online charging system according to the present invention.

FIG. 11 is a schematic structural diagram of Embodiment 3 of an online charging system according to the present invention. As shown in FIG. 11, an online charging system 500 provided by this embodiment includes a processor 51 and a memory 52. The online charging system 500 may further include a transmitter 53 and a receiver 54. The transmitter 53 and receiver 54 may be connected to the processor 51. The memory 52 stores an executable instruction; when the online charging system 500 is running, the processor 51 communicates with the memory 52; and the processor 51 invokes the executable instruction in the memory 52 to execute the method embodiment shown in FIG. 1. The implementation principles and technical effects thereof are similar, and are not repeatedly described herein.

Figure 12:
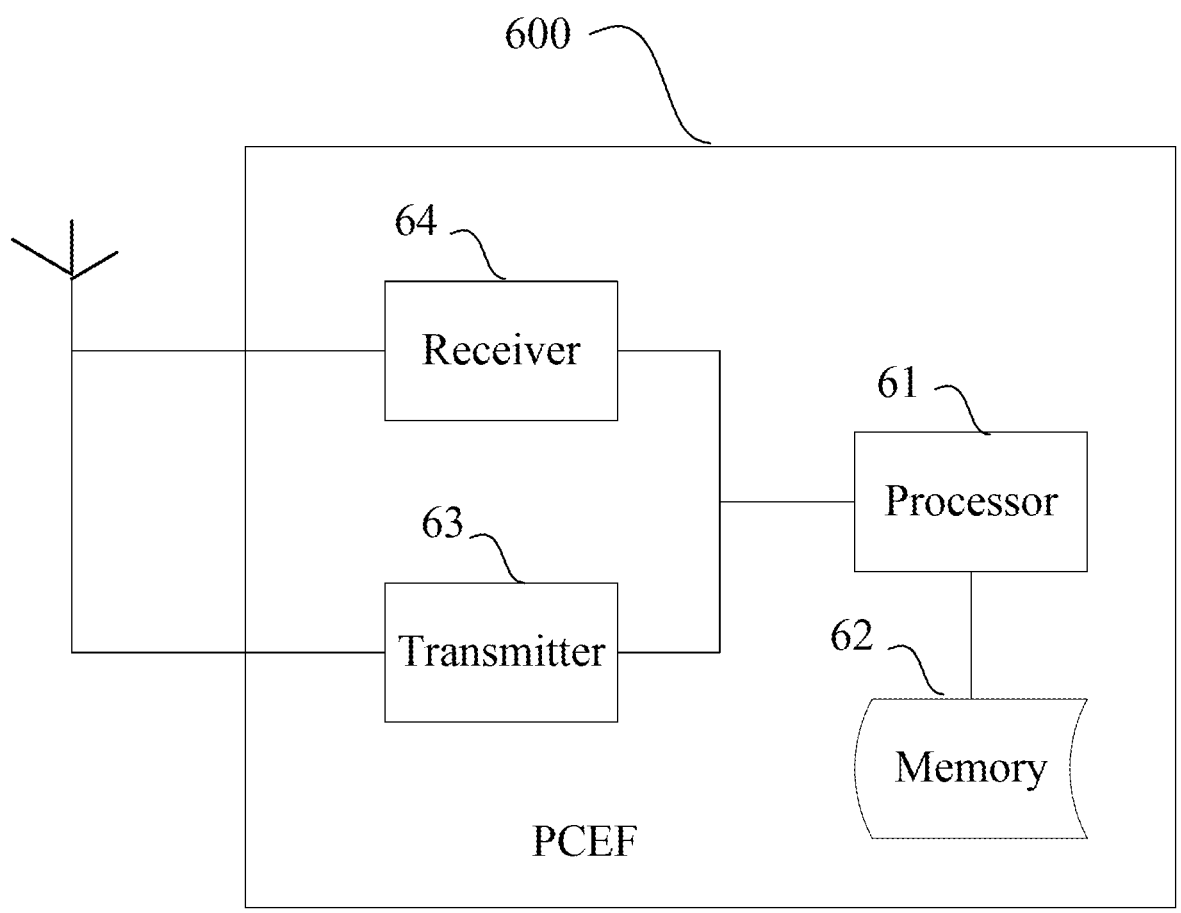
FIG. 12 is a schematic structural diagram of Embodiment 3 of a policy and charging enforcement function entity PCEF according to the present invention.

FIG. 12 is a schematic structural diagram of Embodiment 3 of a policy and charging enforcement function entity PCEF according to the present invention. As shown in FIG. 12, a PCEF 600 provided by this embodiment includes a processor 61 and a memory 62. The PCEF 600 may further include a transmitter 63 and a receiver 64. The transmitter 63 and receiver 64 may be connected to the processor 61. The memory 62 stores an executable instruction; when the PCEF 600 is running, the processor 61 communicates with the memory 62; and the processor 61 invokes the executable instruction in the memory 62 to execute the method embodiment shown in FIG. 2. The implementation principles and technical effects thereof are similar, and are not repeatedly described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. Furthermore, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A credit control method comprising:
receiving a second request sent by a policy and charging enforcement function entity (PCEF), wherein the second request instructs to perform credit control on a second bearer, and the second request comprises a capability negotiation information element (IE) that indicates a credit pool application manner from a plurality of credit pool application manners;

determining, according to the second request, whether a second service borne by the second bearer is permitted to share a first credit pool with a first service borne by a first bearer according to the credit pool application manner indicated by the second request, wherein the second bearer is established for a user equipment (UE) after the first bearer is established for the UE, the first credit pool comprising a first quota allocated to the first bearer; and sending, in response to determining that the second service borne by the second bearer is permitted to share the first credit pool with the first service borne by the first bearer, an answer to the PCEF, wherein the answer carries a first credit pool identifier corresponding to the first bearer and further carries a second quota allocated to the second bearer, and wherein sending the answer causes the PCEF to store the second quota in the first credit pool corresponding to the first credit pool identifier, and causes both the first service borne by the first bearer and the second service borne by the second bearer to concurrently consume credit from the first credit pool based on the first quota allocated to the first bearer and the second quota allocated to the second bearer before either the first service ends or the second service ends.

2. The method according to claim 1, wherein sending the answer to the PCEF comprises:
allocating the second quota to the second bearer.

3. The method according to claim 1, further comprising:
receiving a capability negotiation request sent by the PCEF, wherein the capability negotiation request carries the capability negotiation IE that indicates the credit pool application manner; and sending, in response to receiving the capability negotiation request, a capability negotiation field answer to the PCEF.

4. A credit control method comprising:
sending a second request to an online charging system (OCS), wherein the second request instructs to perform credit control on a second bearer, and the second request comprises a capability negotiation information element (IE) that indicates a credit pool application manner from a plurality of credit pool application manners;

receiving an answer sent by the OCS, wherein the answer carries a first credit pool identifier corresponding to a first bearer, according to a determination that a second service borne by the second bearer is permitted to share a first credit pool with a first service borne by the first bearer according to the credit pool application manner indicated by the second request, wherein the answer further carries a second quota allocated to the second bearer, and wherein the second bearer is established for a user equipment (UE) after the first bearer is established for the UE, the first credit pool comprising a first quota allocated to the first bearer; and storing the second quota in the first credit pool corresponding to the first credit pool identifier, wherein, according to the first credit pool identifier and the second quota, the first credit pool is shared by the first service borne by the first bearer and the second service borne by the second bearer, and wherein storing the second quota causes the first service borne by the first bearer and the second service borne by the second bearer to concurrently consume credit from the first credit pool based on the first quota allocated to the first bearer and the second quota allocated to the second bearer before either the first service ends or the second service ends.

5. The method according to claim 4, further comprising:
sending a capability negotiation request to the OCS, wherein the capability negotiation request carries the capability negotiation IE indicating the credit pool application manner; and receiving, in response to sending the capability negotiation request, a capability negotiation field answer sent by the OCS.

6. An online charging system comprising:
a receiver configured to receive a second request sent by a policy and charging enforcement function entity (PCEF), wherein the second request instructs to perform credit control on a second bearer, and the second request comprises a capability negotiation information element (IE) that indicates a credit pool application manner from a plurality of credit pool application manners;

a processor;

a non-transitory memory storing a program to be executed in the processor, the program comprising instructions for determining, according to the second request, whether a second service borne by the second bearer is permitted to share a first credit pool with a first service borne by a first bearer according to the credit pool application manner indicated by the second request, wherein the second bearer is established for a user equipment (UE) after the first bearer is established for the UE, the first credit pool comprising a first quota allocated to the first bearer; and a transmitter configured to send an answer to the PCEF in response to the processor determining that the second service borne by the second bearer is permitted to share the first credit pool with the first service borne by the first bearer, wherein the answer carries a first credit pool identifier corresponding to the first bearer and further carries a second quota allocated to the second bearer, wherein sending the answer causes the PCEF to store the second quota in the first credit pool corresponding to the first credit pool identifier, and causes both the first service borne by the first bearer and the second service borne by the second bearer to concurrently consume credit from the first credit pool based on the first quota allocated to the first bearer and the second quota allocated to the second bearer before either the first service ends or the second service ends.

7. The online charging system according to claim 6, wherein the program further includes instructions for allocating the second quota to the second bearer when it is determined that the second service borne by the second bearer is permitted to share the first credit pool with the first service borne by the first bearer.

8. The online charging system according to claim 6, wherein the first bearer and the second bearer belong to a same Internet Protocol connectivity access network (IP-CAN) session.

9. The online charging system according to claim 6, wherein the first bearer belongs to a first Internet Protocol Connectivity Access Network (IP-CAN) session, and the second bearer belongs to a second IP-CAN session, wherein the first IP-CAN session and the second IP-CAN session are different sessions.

10. The online charging system according to claim 6, wherein the receiver is further configured to receive a capability negotiation request sent by the PCEF, wherein the capability negotiation request carries the capability negotiation IE indicating the credit pool application manner; and
wherein the transmitter is further configured to send a capability negotiation field answer to the PCEF.

11. A policy and charging enforcement function entity (PCEF) comprising:
a transmitter configured to send a second request to an online charging system (OCS), wherein the second request instructs to perform credit control on a second bearer, and the second request comprises a capability negotiation information element (IE) that indicates a credit pool application manner from a plurality of credit pool application manners; and
a receiver configured to:
receive a second answer sent by the OCS, wherein the second answer carries a first credit pool identifier corresponding to a first bearer, according to a determination that a second service borne by the second bearer is permitted to share a first credit pool with a first service borne by the first bearer according to the credit pool application manner indicated by the second request, wherein the second answer further carries a second quota allocated to the second bearer, and wherein the second bearer is established for a user equipment (UE) after the first bearer is established for the UE, the first credit pool comprising a first quota allocated to the first bearer; and
store the second quota in the first credit pool corresponding to the first credit pool identifier,
wherein, according to the first credit pool identifier and the second quota, the first credit pool is shared by the first service borne by the first bearer and the second service borne by the second bearer, and wherein storing the second quota causes both the first service borne by the first bearer and the second service borne by the second bearer to concurrently consume credit from the first credit pool based on the first quota allocated to the first bearer and the second quota allocated to the second bearer before either the first service ends or the second service ends.

12. The PCEF according to claim 11, wherein the transmitter is further configured to send a first request to the OCS, wherein the first request instructs to perform credit control on the first bearer; and
wherein the receiver is further configured to receive a first answer sent by the OCS, wherein the first answer carries the first quota and the first credit pool identifier corresponding to the first quota of the first bearer.

13. The PCEF according to claim 12, wherein the transmitter is further configured to send the second request to the OCS by using a second Gy session;
wherein the receiver is further configured to receive the second answer sent by the OCS by using the second Gy session;
wherein the transmitter is further configured to send the first request to the OCS by using a first Gy session;
wherein the receiver is further configured to receive the first answer sent by the OCS by using the first Gy session; and
wherein the first Gy session and the second Gy session are communications conducted on a Gy interface between the PCEF and the OCS.

14. The PCEF according to claim 13, wherein the first Gy session and the second Gy session are different Gy sessions, or a same shared Gy session.

15. The PCEF according to claim 14, wherein, when the first Gy session and the second Gy session are different Gy sessions:
the transmitter is further configured to:
send a first update credit control request to the OCS by using the first Gy session, wherein the first update credit control request carries a third quota consumed by the first bearer; and
send a second update credit control request to the OCS by using the second Gy session, wherein the second update credit control request carries a fourth quota consumed by the second bearer; and
the receiver is further configured to:
receive a first update credit control answer sent by the OCS by using the first Gy session, wherein the first update credit control answer carries a fifth quota newly allocated to the first bearer; and
receive a second update credit control answer sent by the OCS by using the second Gy session, wherein the second update credit control answer carries a sixth quota newly allocated to the second bearer.

16. The PCEF according to claim 15, wherein, when the first Gy session and the second Gy session are a same shared Gy session:
the transmitter is further configured to send a third update credit control request to the OCS by using the same shared Gy session, wherein the third update credit control request carries the third quota consumed by the first bearer and the fourth quota consumed by the second bearer; and
the receiver is further configured to receive a third update credit control answer sent by the OCS by using the same shared Gy session, wherein the third update credit control answer carries the fifth quota newly allocated to the first bearer and the sixth quota newly allocated to the second bearer.

17. The PCEF according to claim 11, wherein the first bearer belongs to a first Internet Protocol Connectivity Access Network (IP-CAN) session, and the second bearer belongs to a second IP-CAN session, wherein the first IP-CAN session and the second IP-CAN session are different sessions.

18. The PCEF according to claim 11, wherein the first bearer and the second bearer belong to a same Internet Protocol connectivity access network session IP-CAN session.

19. The PCEF according to claim 18, wherein:
the transmitter is further configured to send a capability negotiation request to the OCS, wherein the capability negotiation request carries the capability negotiation IE indicating the credit pool application manner; and
the receiver is further configured to receive a capability negotiation field answer sent by the OCS.

20. The method according to claim 1, wherein the plurality of credit pool application manners comprises:
a first credit pool application manner, wherein the first credit pool application manner permits multiple Internet Protocol Connectivity Access Network (IP-CAN) bearers in a same IP-CAN session to share a credit pool; and
a second credit pool application manner, wherein the second credit pool application manner permits multiple IP-CAN sessions of a same user to share the credit pool.

* * * * *